United States Patent
He et al.

(10) Patent No.: US 11,832,244 B2
(45) Date of Patent: Nov. 28, 2023

(54) TIMERS AND UPLINK SKIPPING

(71) Applicant: QUALCOMM Incorporated, San Diego, CA (US)

(72) Inventors: Linhai He, San Diego, CA (US); Peter Gaal, San Diego, CA (US); Leena Zacharias, San Jose, CA (US); Mahbod Ghelichi, San Diego, CA (US); James Francis Geekie, Carlsbad, CA (US); Brian Clarke Banister, San Diego, CA (US); Arnaud Meylan, San Diego, CA (US); Michel Evan Chauvin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/364,472

(22) Filed: Jun. 30, 2021

(65) Prior Publication Data

US 2022/0015119 A1    Jan. 13, 2022

Related U.S. Application Data

(60) Provisional application No. 63/049,876, filed on Jul. 9, 2020.

(51) Int. Cl.
  *H04W 72/1268* (2023.01)
  *H04W 76/28* (2018.01)
  *H04W 72/23* (2023.01)

(52) U.S. Cl.
  CPC ....... *H04W 72/1268* (2013.01); *H04W 72/23* (2023.01); *H04W 76/28* (2018.02)

(58) Field of Classification Search
  CPC .. H04W 72/14; H04W 72/1268; H04W 76/28
  See application file for complete search history.

(56) References Cited

U.S. PATENT DOCUMENTS

| 2015/0256305 | A1* | 9/2015 | Yerramalli ........ H04W 72/0446 370/336 |
| 2019/0075550 | A1 | 3/2019 | Lee et al. |

(Continued)

FOREIGN PATENT DOCUMENTS

| EP | 3720196 A1 | 10/2020 |
| WO | 2019088531 A1 | 5/2019 |
| WO | 2019137457 A1 | 7/2019 |

OTHER PUBLICATIONS

International Search Report and Written Opinion—PCT/US2021/040183—ISA/EPO—dated Oct. 28, 2021.

*Primary Examiner* — Kevin M Cunningham
(74) *Attorney, Agent, or Firm* — Muncy, Geissler, Olds & Lowe, P.C./Qualcomm Incorporated

(57) ABSTRACT

In an aspect, a user equipment (UE) may receive an uplink (UL) grant (e.g., dynamic UL grant, UL configured grant (CG)) from a network, but may decide to skip the UL grant altogether or not transmit any user plane data on the UL grant. In such instances, the UE may maintain or expedite expiration associated with one or more timers (e.g., discontinuous reception (DRX) and bandwidth part (BWP) inactivity timers, secondary cell (SCell) deactivation timer, etc.). The UE may also maintain or expedite expiration associated with one or more timers if it receives downlink (DL) transmission (e.g., DL semi-persistent scheduling (SPS)) from the network that includes no user plane data.

25 Claims, 13 Drawing Sheets

(56) References Cited

U.S. PATENT DOCUMENTS

2021/0385846 A1* 12/2021 Lee .................. H04W 28/0278
2022/0210856 A1*  6/2022 Zhang ................ H04W 76/20

* cited by examiner

TIMERS AND UPLINK SKIPPING

CROSS-REFERENCE TO RELATED APPLICATION

The present application for patent claims the benefit of U.S. Provisional Patent Application No. 63/049,876 entitled "TIMERS AND UPLINK SKIPPING," filed Jul. 9, 2020, assigned to the assignee hereof, and expressly incorporated herein by reference in its entirety.

FIELD OF DISCLOSURE

Aspects of the disclosure relate generally to wireless communications, and more particularly to inactivity and/or deactivation timers and uplink (UL) skipping. Certain embodiments of the technology discussed below can enable user equipments (UEs) to be more power efficient.

BACKGROUND

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented later.

In 5G NR, several inactivity and deactivation timers (e.g., discontinuous reception (DRX) inactivity timer, bandwidth part (BWP) inactivity timer, secondary cell (SCell) deactivation timer, etc.) are used to help the UE manage power consumption. For each timer, the UE may be in one state while the timer is running, and in another state when the timer expires (stops running) until the timer is restarted.

Between the states, one is typically more power efficient. For example, if the DRX inactivity timer is running, the UE actively monitors the physical downlink control channel (PDCCH), e.g., to see if it has been granted UL resources for data transmission. Such active monitoring can consume power. But if the DRX inactivity timer expires, the UE can enter into a DRX state in which it stops monitoring the PDCCH, which can save on power consumption.

Conventionally, if the UE is provided with UL grant (e.g., dynamic UL grant), the timers, such as the DRX inactivity timer, are restarted, regardless of whether the UE actually has data to send or not. This means that the UE can be delayed from entering into the power saving state even when it does not have data to transmit.

Embodiments of the disclosure are directed to enabling the UE to enter into the power saving state sooner, at least relative to the conventional techniques. For example, if the UE cannot take advantage of the granted UL resources (e.g., it has no data (or user plane data) to send), then the UE may continue to run the timers instead of restarting them. In this way, the expiration of the timers are not delayed. In some instances, the timers may be expedited to expire earlier. In this way, the UE may enter into the power saving state earlier, and thus be more power efficient. In yet some other instances, if the timers are not running, i.e., have not started yet, they need not be started in the first place. In this way, the UE need not enter into power consuming state at all.

An aspect is directed to a method of operating a user equipment (UE). The method may comprise receiving an uplink (UL) grant from a network for transmission of data from the UE to the network. The method may also comprise determining whether conditions for maintaining or expediting timers are met. The method may further comprise maintaining or expediting expiration associated with one or more running timers if it is determined that the conditions for maintaining or expediting timers are met. Each running timer may be a timer associated with the UL grant and running at the time the UL grant is received.

An aspect is directed to a user equipment (UE). The UE may comprise means for receiving an uplink (UL) grant from a network for transmission of data from the UE to the network. The UE may also comprise means for determining whether conditions for maintaining or expediting timers are met. The UE may further comprise means for maintaining or expediting expiration associated with one or more running timers if it is determined that the conditions for maintaining or expediting timers are met. Each running timer may be a timer associated with the UL grant and running at the time the UL grant is received.

An aspect is directed to a user equipment (UE). The UE may comprise a memory, at least one transceiver, and at least one processor communicatively coupled to the memory and the at least one transceiver. The at least one processor may be configured to receive an uplink (UL) grant from a network for transmission of data from the UE to the network. The at least one processor may also be configured to determine whether conditions for maintaining or expediting timers are met. The at least one processor may further be configured to maintain or expedite expiration associated with one or more running timers if it is determined that the conditions for maintaining or expediting timers are met.

Each running timer may be a timer associated with the UL grant and running at the time the UL grant is received.

An aspect is directed to a non-transitory computer-readable medium containing instructions for a user equipment (UE) stored thereon. The instructions may cause the UE to receive an uplink (UL) grant from a network for transmission of data from the UE to the network. The instructions may also cause the UE to determine whether conditions for maintaining or expediting timers are met. The instructions may further cause the UE to maintain or expedite expiration associated with one or more running timers if it is determined that the conditions for maintaining or expediting timers are met. Each running timer may be a timer associated with the UL grant and running at the time the UL grant is received.

An aspect is directed to a method of operating a user equipment (UE). The method may comprise receiving a downlink (DL) transmission from a network, the DL transmission comprising data. The method may also comprise determining whether the received data include user plane data. The method may further comprise maintaining or expediting expiration associated with one or more running timers if it is determined that the received data does include the user plane data. Each running timer may be a timer associated with the UL grant and running at the time the DL transmission is received.

An aspect is directed to a user equipment (UE). The UE may comprise means for receiving a downlink (DL) transmission from a network, the DL transmission comprising data. The UE may also comprise means for determining whether the received data include user plane data. The UE may further comprise means for maintaining or expediting expiration associated with one or more running timers if it is determined that the received data does include the user plane data. Each running timer may be a timer associated with the UL grant and running at the time the DL transmission is received.

An aspect is directed to a user equipment (UE). The UE may comprise a memory, at least one transceiver, and at least one processor communicatively coupled to the memory and the at least one transceiver. The at least one processor may be configured to receive a downlink (DL) transmission from a network, the DL transmission comprising data. The at least one processor may also be configured to determine whether the received data include user plane data. The at least one processor may further be configured to maintain or expedite expiration associated with one or more running timers if it is determined that the received data does include the user plane data. Each running timer may be a timer associated with the UL grant and running at the time the DL transmission is received.

An aspect is directed to a non-transitory computer-readable medium containing instructions for a user equipment (UE) stored thereon. The instructions may cause the UE to receive a downlink (DL) transmission from a network, the DL transmission comprising data. The instructions may also cause the UE to determine whether the received data include user plane data. The instructions may further cause the UE to maintain or expedite expiration associated with one or more running timers if it is determined that the received data does include the user plane data. Each running timer may be a timer associated with the UL grant and running at the time the DL transmission is received.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
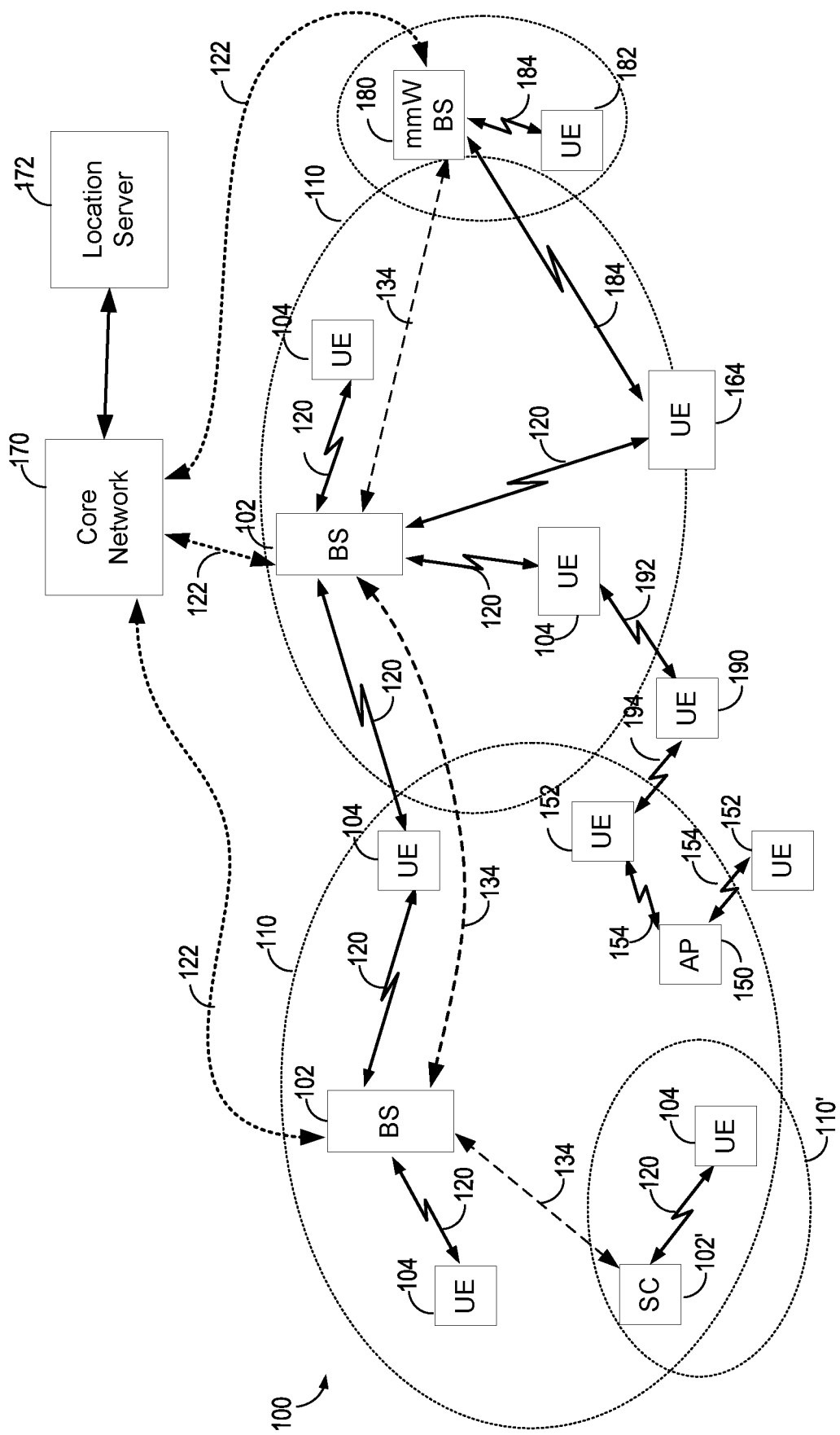
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s).

To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 MHz to 6 GHz), FR2 (from 24.25 to 52.6 GHz), FR3 (above 52.6 GHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure.

The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
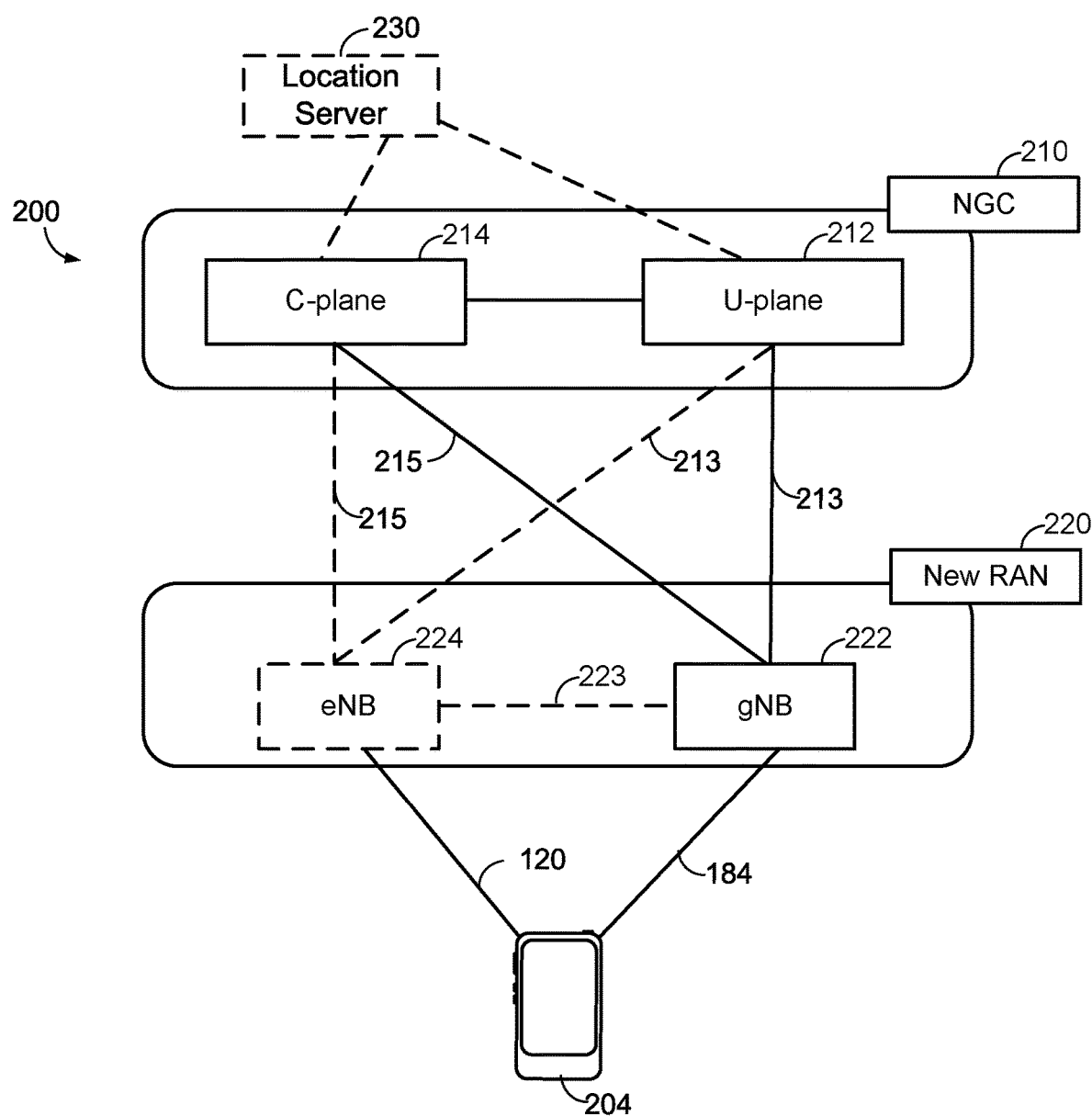
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212.

In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1).

Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
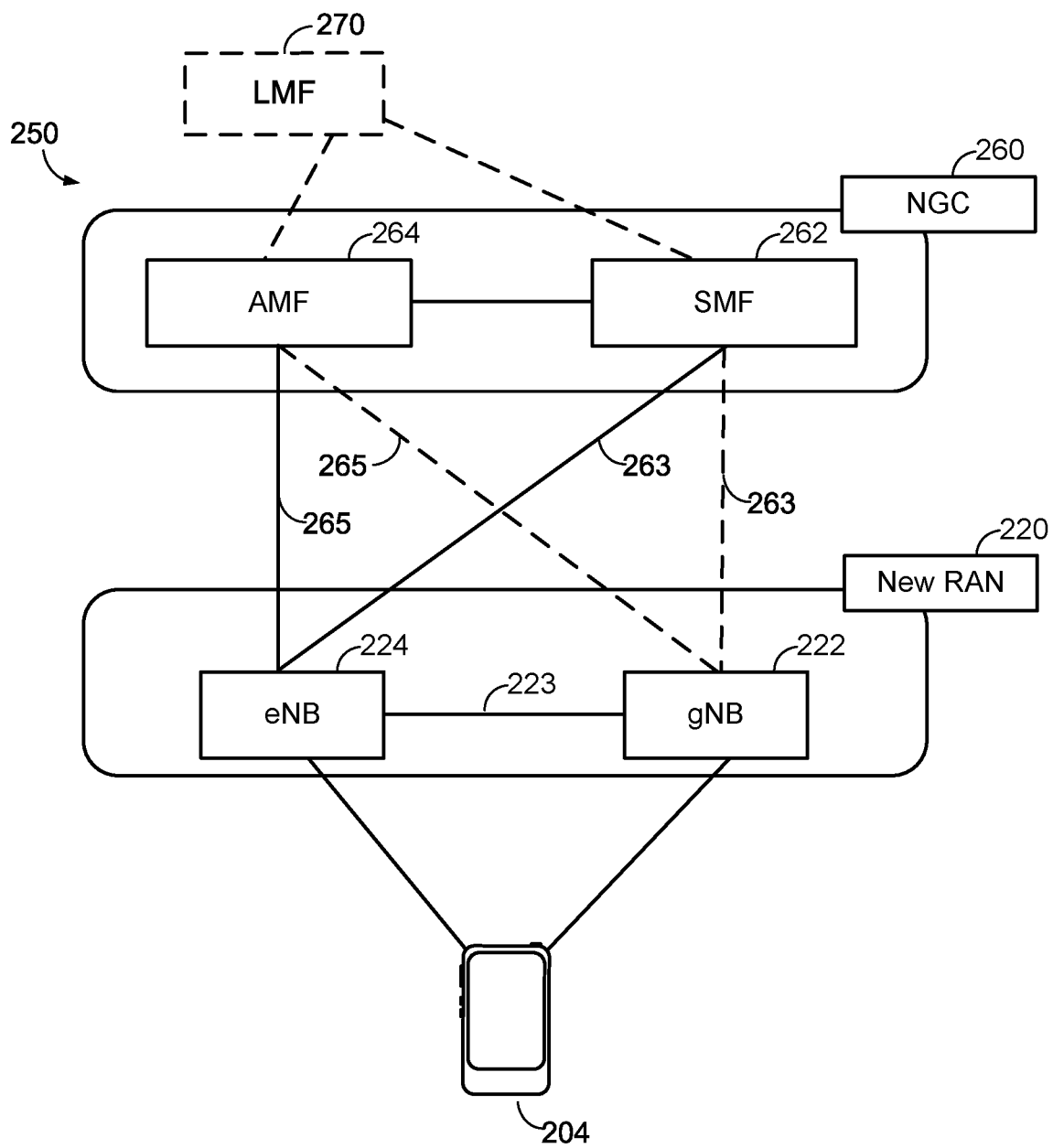

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively.

In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF may include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF).

The AMF may also interact with the authentication server function (AUSF) (not shown) and the UE 204, and receive the intermediate key that was established as a result of the UE 204 authentication process. In the case of authentication based on a UMTS (universal mobile telecommunications system) subscriber identity module (USIM), the AMF may retrieve the security material from the AUSF.

The functions of the AMF may also include security context management (SCM). The SCM may receive a key from the SEAF that it uses to derive access-network specific keys. The functionality of the AMF further include location services management for regulatory services, transport for location services messages between the UE 204 and the location management function (LMF) 270, as well as between the New RAN 220 and the LMF 270, evolved packet system (EPS) bearer identifier allocation for inter-working with the EPS, and UE 204 mobility event notification. In addition, the AMF also supports functionalities for non-3GPP access networks.

Functions of the UPF may include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 may include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
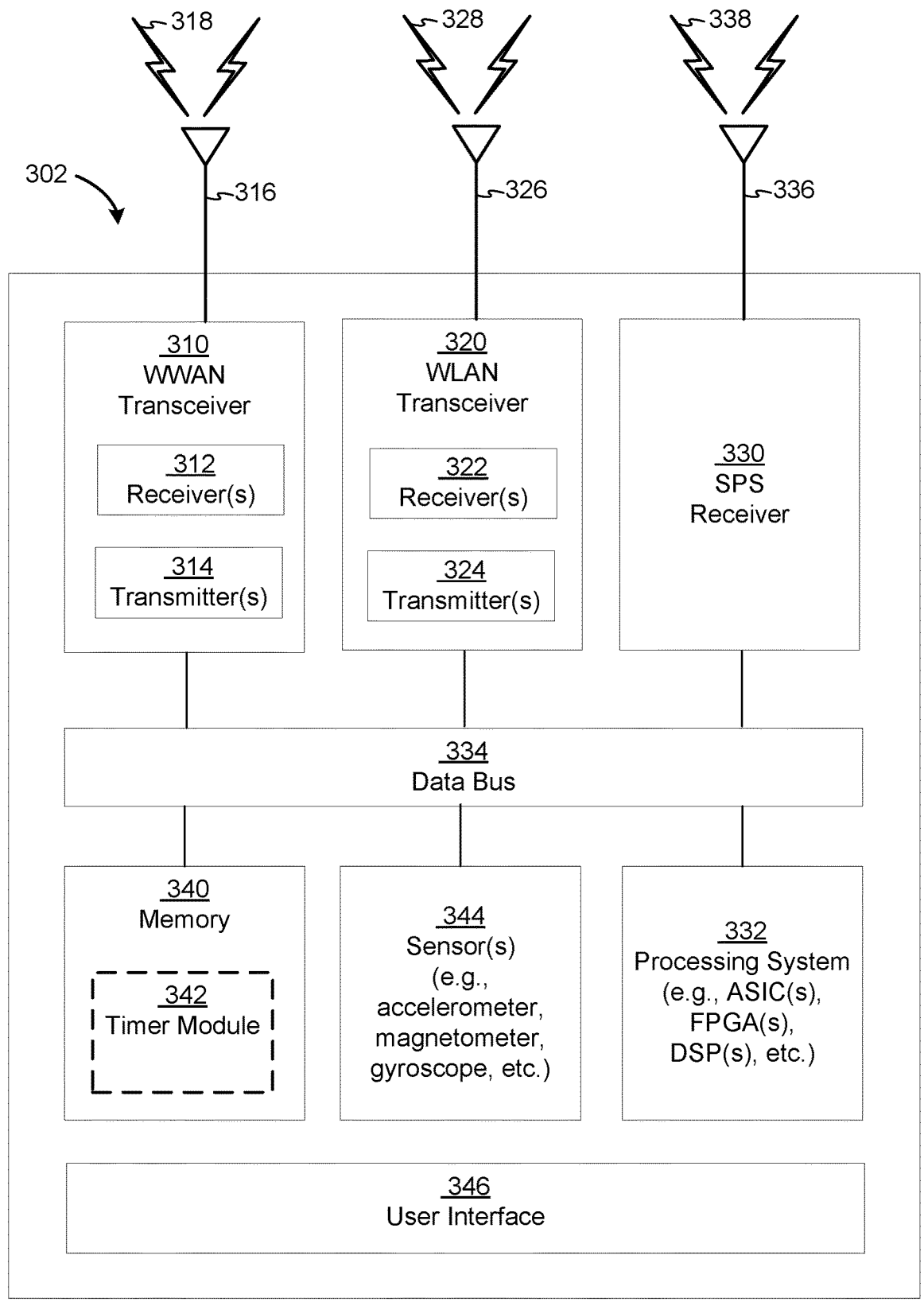
FIGS. 3A to 3C are simplified block diagrams of several sample aspects of components that may be employed in wireless communication nodes and configured to support communication as taught herein.
Figure 3B:
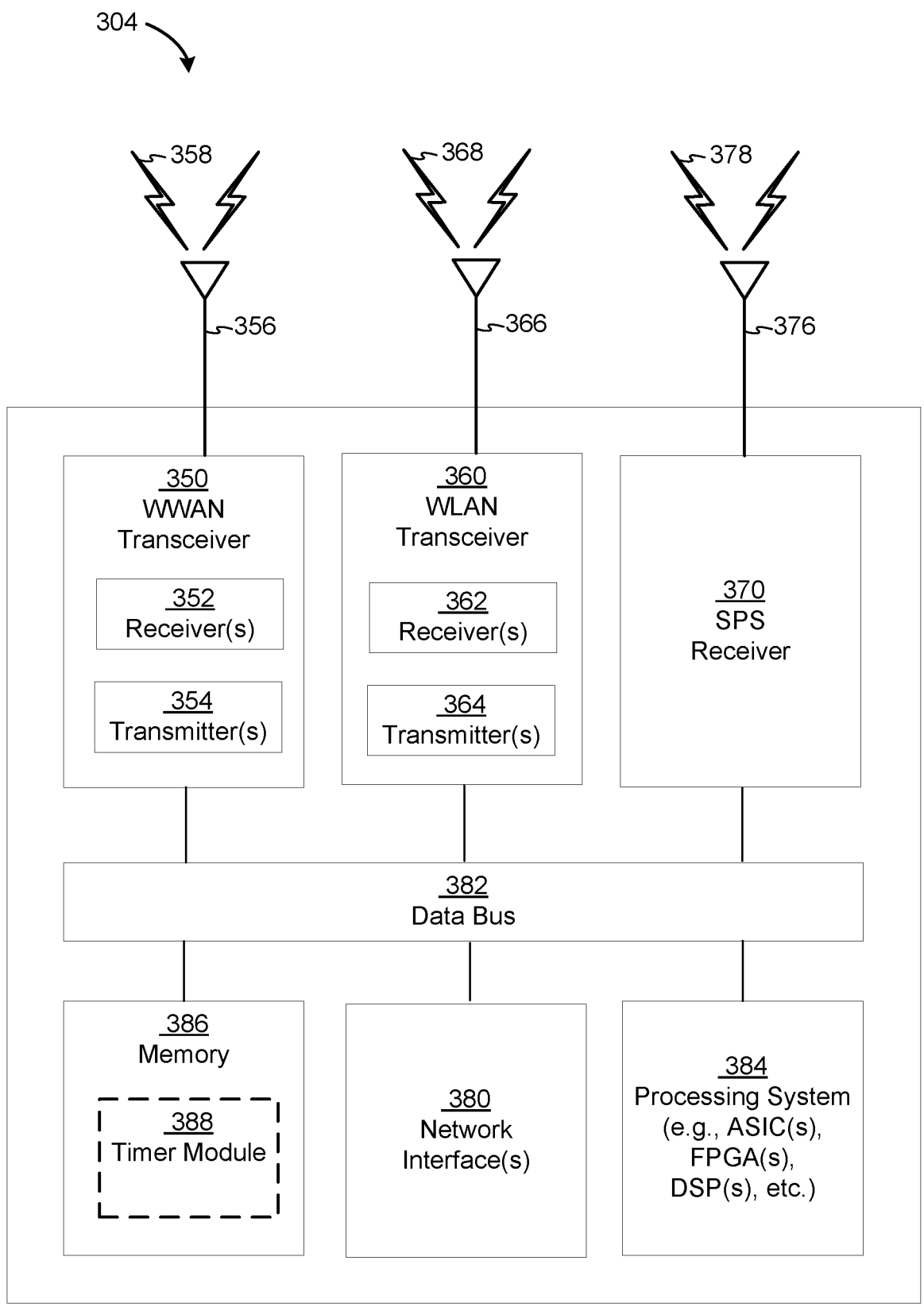
Figure 3C:
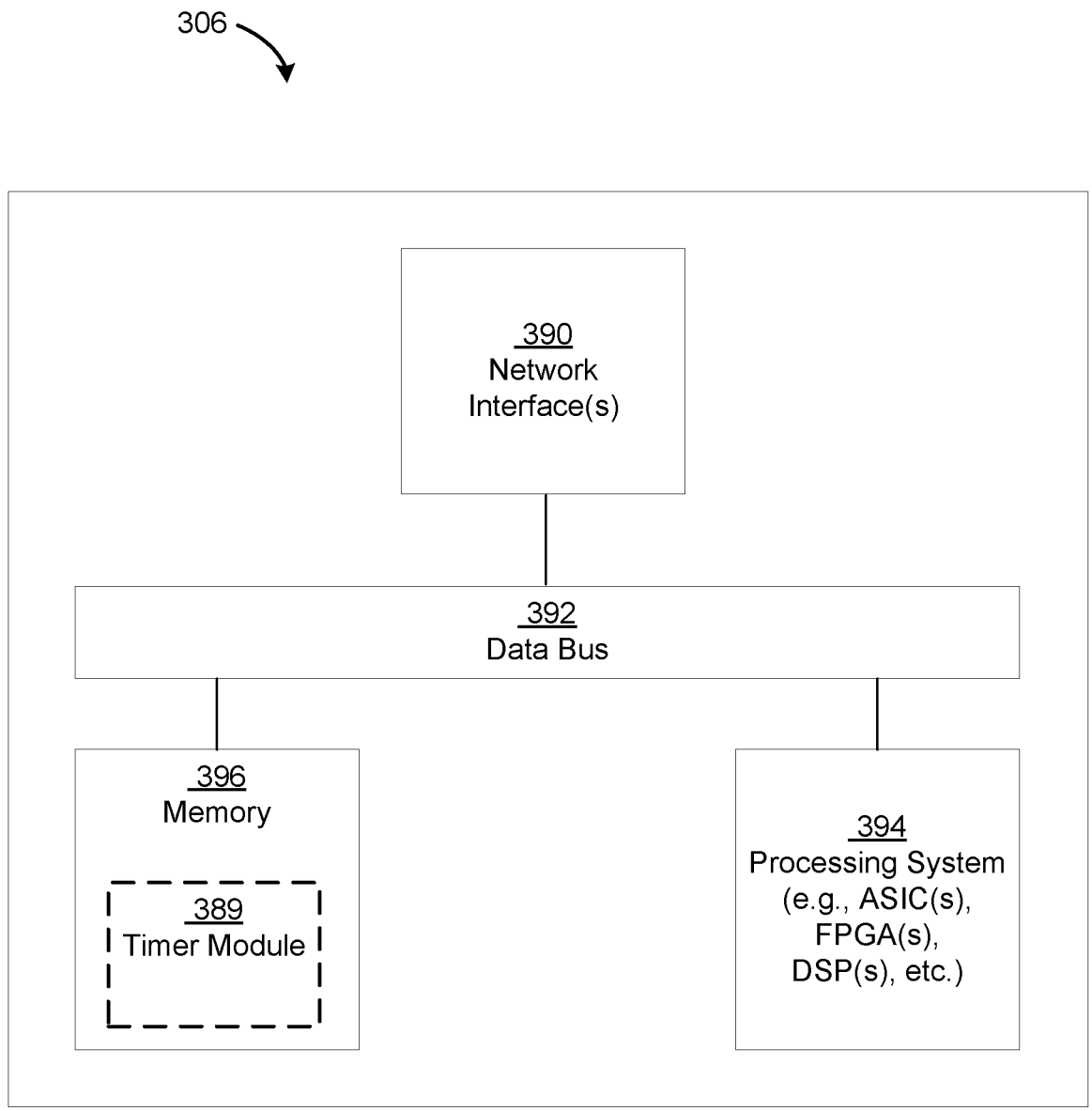

FIGS. 3A, 3B, and 3C illustrate several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 may each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 may include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 may include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 may include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 336, and 376), such as an antenna array, that permits the respective apparatus to perform transmit "beamforming," as described herein. Similarly, a receiver may include or be coupled to a plurality of antennas (e.g., antennas 316, 336, and 376), such as an antenna array, that permits the respective apparatus to perform receive beamforming, as described herein. In an aspect, the transmitter and receiver may share the same plurality of antennas (e.g., antennas 316, 336, and 376), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 may include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine the apparatus' 302 and 304 positions using measurements obtained by any suitable SPS algorithm.

The base station 304 and the network entity 306 may each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving: messages, parameters, or other types of information.

The apparatuses 302, 304, and 306 may include other components that can be used in conjunction with the operations as disclosed herein. The UE 302 may include processor circuitry implementing a processing system 332 for providing other processing functionalities. The base station 304 may include a processing system 384 for providing processing functionalities. The network entity 306 may include a processing system 394 for providing processing functionalities. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 may include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304 and/or 306 may include timer modules 342, 388 and 389, respectively. The timer modules 342, 388 and 389 may each comprise a hardware circuit that is part of or coupled to the processing system 332, that, when executed, causes the apparatuses 302, 304 and/or 306 to perform the functionality described herein. Alternatively, the timer modules 342, 388 and 389 may be memory modules (as shown in FIGS. 3A-3C) stored in the memory components 340, 386 and 396, respectively, that, when executed by the processing systems 332, 384 and 394, respectively, cause the apparatuses 302, 304 and/or 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the GPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 may include a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream may be spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 may receive a signal through its respective antenna(s) 316. The receiver 312 may recover information modulated onto an RF carrier and provide the information to the processing system 332. The transmitter 314 and the receiver 312 may implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 may then convert the OFDM symbol stream from the time-domain to the frequency domain using a fast Fourier transform (FFT). The frequency domain signal may comprise a separate OFDM symbol stream for each subcarrier of the OFDM signal. The symbols on each subcarrier, and the reference signal, may be recovered and demodulated by determining the most likely signal constellation points transmitted by the base station 304. These soft decisions may be based on channel estimates computed by a channel estimator. The soft decisions may then be decoded and de-interleaved to recover the data and control signals that were originally transmitted by the base station 304 on the physical channel. The data and control signals may be provided to the processing system 332, which may implement Layer-3 and Layer-2 functionalities.

In the UL, the processing system 332 may provide demultiplexing between transport and logical channels, packet reassembly, deciphering, header decompression, and control signal processing to recover IP packets from the core network. The processing system 332 may also be responsible for error detection.

Similar to the functionality described in connection with the DL transmission by the base station 304, the processing system 332 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission may be processed at the base station 304 in a manner similar to that described in connection with the receiver function at the UE 302. The receiver 352 may receive a signal through its respective antenna(s) 356. The receiver 352 may recover information modulated onto an RF carrier and provide the information to the processing system 384.

In the UL, the processing system 384 may provide demultiplexing between transport and logical channels, packet reassembly, deciphering, header decompression, control signal processing to recover IP packets from the UE 302. IP packets from the processing system 384 may be provided to the core network. The processing system 384 may also be responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components).

Similarly, some or all of the functionality represented by blocks 350 to 384 may be implemented by processor and memory component(s) of the base station 304 (e.g., by execution of appropriate code and/or by appropriate configuration of processor components). Also, some or all of the functionality represented by blocks 390 to 396 may be implemented by processor and memory component(s) of the network entity 306 (e.g., by execution of appropriate code and/or by appropriate configuration of processor components).

For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the timer modules 342, 388 and/or 389, etc.

In NR, several inactivity and deactivation timers are used to help the UE manage power consumption. Some of the timers are listed below along with their triggering conditions and the UE's behaviors upon their expiration:

Discontinuous reception (DRX) inactivity timer:
  Triggering condition:
    Physical downlink control channel (PDCCH) indication for new UL/DL data transmission;
  Behavior upon expiration:
    The UE enters DRX state, i.e., stops monitoring PDCCH;
Bandwidth part (BWP) inactivity timer:
  Triggering condition:
    PDCCH indication for new UL/DL data transmission;
    New data transmission over either UL configured grant (CG) or DL semi-persistent scheduling (SPS);
  Behavior upon expiration:
    The UE switches to a default BWP (if configured) or to an initial BWP (if default BWP not configured). Typically, the default/initial BWP has narrower bandwidth than active BWP making the default/initial BWP more power efficient;
Secondary cell (SCell) deactivation timer:
  Triggering condition:
    PDCCH indication for new UL/DL data transmission;
    New data transmission over either UL CG or DL SPS;
  Behavior upon expiration:
    The UE deactivates the corresponding SCell.

Also in NR, if the UE is provided with a dynamic UL grant for new data transmission but it has no data to send and the skip UplinkTxDynamic flag is enabled, the UE is allowed to skip the grant, i.e., not transmit anything.

Currently, inactivity and deactivation timers are restarted regardless of whether a dynamic UL grant is skipped or not. When the UL grant is skipped, it means that no data will be transmitted. This implies that UE could be allowed enter into a more power efficient state sooner. Unfortunately, when the timers are restarted, the UE is delayed from entering the power efficient state, which can result in unnecessary power consumption. Thus, restarting the timers can be less power efficient.

To address such issues, it is proposed to increase power efficiency of the UE by maintaining, or even expediting, the expirations associated with the timers if the UL grant is skipped. In this way, the UE is not delayed from entering the power efficient state. Indeed, in some instances, the UE entering the power efficient state may be accelerated. In some other instances, if the timers are not running in the first place (e.g., they may have expired), they need not be started at all. In this way, the UE need not enter into power consuming state.

In an aspect, the proposed technique(s) may be extended to increase UE power efficiency in cases where the user plane data is skipped, and/or where the user plane data is not received, e.g., in DL semi-persistent scheduling (DL SPS). In another aspect, the proposed technique(s) may be extended to incorporate other types of UL grants (dynamic, configured grants (CG), etc.).

Figure 4:
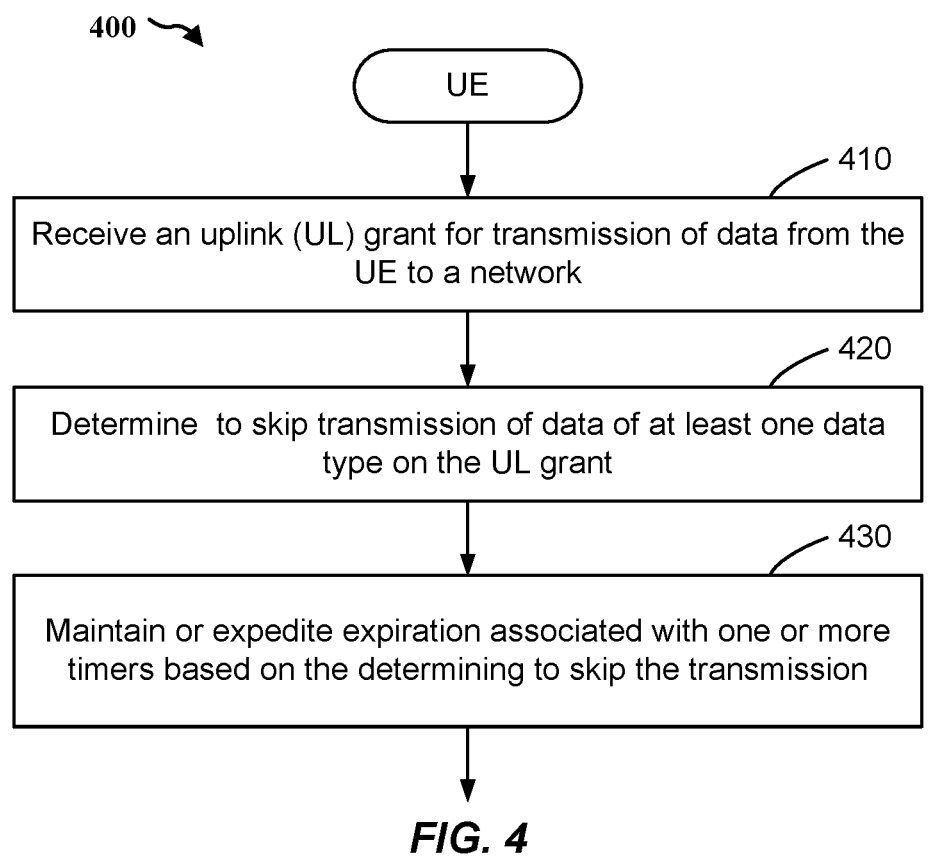
FIG. 4 illustrates a flow chart of an exemplary method of operating a user equipment, according to various aspects.

FIG. 4 illustrates a flow chart of an example method 400 of operating a UE, e.g., to enhance power efficiency in accordance with one or more aspects. The UE may be any of the UEs described above (e.g., UE 104, UE 204, UE 302).

In block 410, the UE (e.g., receiver 312, receiver 322, processing system 332, memory 340, timer module 342, etc.) may receive a UL grant for transmission of data from the UE to a network. For example, a base station 304 (e.g., gNB) may send the UL grant to the UE. The UL grant may be a dynamic UL grant or a UL configured grant (UL CG). As will be discussed further below, if the UL grant is the dynamic UL grant, expirations associated with timers such as the DRX inactivity timer, the BWP inactivity timer, the SCell deactivation timer, etc. may be maintained or expedited.

In block 420, the UE (e.g., processing system 332, memory 340, timer module 342, etc.) may determine to skip transmission of data of at least one data type on the UL grant. If the UL grant is the dynamic UL grant, one way to implement block 420 may be skipping the UL grant altogether. In one example, the UE may determine to skip the dynamic UL grant if the UE has no data of any type to transmit.

In another example, the UE may determine to skip the dynamic UL grant if there are no data of any type to transmit and if N consecutive previous dynamic UL grants have been skipped. In this example, N may be said to represent a number of consecutive dynamic UL grants in which the UE's behavior could be conventional. That is, for N consecutive dynamic UL grants, the timers may be restarted even if those grants were skipped. But if the N+1'th consecutive dynamic UL grant is skipped, the expirations associated with the one or more timers may be maintained or expedited. For example, if N=1, then on the second consecutive dynamic UL grant, which is the current dynamic UL grant, the expirations of the timers may be maintained or expedited instead of being restarted.

In a further example, the UE may determine to skip the dynamic UL grant if there are no data of any type to transmit and if M consecutive previous UL slots all having dynamic UL grants were skipped. In this example, M may be said to represent a number of consecutive slots that had dynamic UL grants skipped in which the UE's behavior could be conventional. But if the M+1'th consecutive slot having the dynamic UL grant is skipped, the expirations associated with the one or more timers may be maintained or expedited instead of being restarted.

If the UL grant is the dynamic UL grant, another way to implement block 420 may be to skip transmission of user plane data on the dynamic UL grant. In an aspect, a MAC SDU containing only data from dedicated traffic logic channels may be viewed as an example of user plane data. In this aspect, if there are no MAC SDUs containing data from dedicated traffic logic channels, then it may be determined that there are no user plane data. In one example, the UE may determine to skip transmission of the user plane data on the dynamic UL grant if the UE has no user plane data to transmit.

In another example, the UE may determine to skip transmission of the user plane data on the dynamic UL grant if there are no user plane data to transmit and if no user plane data were transmitted on N consecutive previous dynamic UL grants. Here, N may be said to represent a number of consecutive dynamic UL grants in which the UE's behavior could be conventional. That is, for N consecutive dynamic UL grants, the timers may be restarted even if no user plane data were transmitted in those grants. Note that in an aspect, skipping the dynamic UL grant altogether may be counted as no user plane data transmission. But if no user plane data is transmitted on the N+1'th consecutive dynamic UL grant, the expirations associated with the one or more timers may be maintained or expedited. It should be noted that N discussed here in the context of dynamic UL grant and user plane data may be the same or different from N discussed above in the context of dynamic UL grant and data of any type.

In a further example, the UE may determine to skip the dynamic UL grant if there are no user plane data to transmit and if no user plane data were transmitted on M consecutive previous UL slots having dynamic UL grants. Here, M may be said to represent a number of consecutive slots with dynamic UL grants that had no user plane data transmissions in which the UE's behavior could be conventional. Again, in an aspect, skipping the dynamic UL grant altogether may be counted as no user plane data transmission. But if no user plane data is transmitted on the M+1'th consecutive slot having the dynamic UL grant, the expirations associated with the one or more timers may be maintained or expedited instead of being restarted. It should be noted that M discussed here in the context of dynamic UL grant and user plane data may be the same or different from M discussed above in the context of dynamic UL grant and data of any type.

If the UL grant is the UL CG grant, a way of implementing block 420 may be to skip transmission of user plane data on the UL CG. In one example, the UE may determine to skip transmission of the user plane data on the UL CG if the UE has no user plane data to transmit.

In another example, the UE may determine to skip transmission of the user plane data on the UL CG if there are no user plane data to transmit and if no user plane data were transmitted on N consecutive previous UL CGs. Here, N may be said to represent a number of consecutive UL CGs in which the UE's behavior could be conventional. However, if no user plane data is transmitted on the N+1'th consecutive UL CG, the expirations associated with the one or more timers may be maintained or expedited. It should be noted that N discussed here in the context of UL CG and user plane data may be the same or different from N discussed in the context of dynamic UL grant and data of any type and/or same or different from N discussed in the context of dynamic UL grant and user plane data.

In a further example, the UE may determine to skip the dynamic UL grant if there are no user plane data to transmit and if no user plane data were transmitted on M consecutive previous UL slots having UL CGs. Here, M may be said to represent a number of consecutive slots with UL CGs that had no user plane data transmissions in which the UE's behavior could be conventional. But if no user plane data is transmitted on the M+1'th consecutive slot having the UL CG, the expirations associated with the one or more timers may be maintained or expedited instead of being restarted. It should be noted that M discussed here in the context of UL CG and user plane data may be the same or different from M discussed in the context of dynamic UL grant and data of any type and/or same or different from M discussed in the context of dynamic UL grant and user plane data.

In block 430, the UE (e.g., processing system 332, memory 340, timer module 342, etc.) may maintain or expedite expirations associated with one or more timers based on the determination made in block 420. That is, if it is determined to skip transmission of data of at least one data type on the UL grant in block 420, the expirations associated with the one or more timers (e.g., DRX inactivity timer, BWP inactivity timer, SCell deactivation timer, etc.) may be maintained or expedited. On the other hand, if any of the one or more timers are not running, e.g., have already expired, those non-running timers may be delayed or otherwise prevented from being started.

In an aspect, block 430 may be implemented by the UE maintaining the expiration of the one or more timers, e.g., by continuing to run the one or more timers in association with one or more respective unchanged expiration times. For example, if the UL grant is the dynamic UL grant and the UE determines to skip the dynamic UL grant, the UE may continue to run the DRX inactivity timer, the BWP inactivity timer, and/or the SCell deactivation timer such that their respective expiration times are unchanged. Alternatively, if any of the DRX inactivity timer, the BWP inactivity timer, and/or the SCell deactivation timer are not currently running, those timers may be delayed or otherwise prevented from being started.

If the UL grant is the dynamic UL grant and the UE determines to skip the transmission of user plane data on the dynamic UL grant, the UE may continue to run the BWP inactivity timer and/or the SCell deactivation timer such that their respective expiration times are unchanged. Alternatively, the BWP inactivity timer, and/or the SCell deactivation timer are not currently running, those timers may be delayed or otherwise prevented from being started.

If the UL grant is the UL CG, the UE may continue to run the BWP inactivity timer and/or the SCell deactivation timer such that their expiration times are unchanged. Alternatively, the BWP inactivity timer, and/or the SCell deactivation timer are not currently running, those timers may be delayed or otherwise prevented from being started.

In another aspect, block 430 may be implemented by the UE expediting the expiration of the one or more timers, e.g., by shortening an amount of time until expiration of the one or more timers is reached. In an aspect, if the UE determines to skip the transmission of data in block 420, the UE may expedite the timers of the one or more timers in block 430. However, it should be noted that contemporaneity between block 420 and 430 is permissible but also is not a requirement. That is, if the UE determines to skip transmission of data in block 420, the UE need not immediately follow with expediting the expiration of the one or more timers. The UE may perform other tasks and return to expedite the expiration of the timers in block 430 before any of the one or more timers expire under previous expiration times.

As an illustration, if the UL grant is the dynamic UL grant and the UE determines to skip the dynamic UL grant, the UE may shorten (e.g., contemporaneously with block 420 or later) the expirations of the DRX inactivity timer, the BWP inactivity timer, and/or the SCell deactivation timer such that their respective expiration times are reached sooner. Alternatively, if any of the DRX inactivity timer, the BWP inactivity timer, and/or the SCell deactivation timer are not currently running, those timers may be delayed or otherwise prevented from being started.

If the UL grant is the dynamic UL grant and the UE determines to skip the transmission of user plane data on the dynamic UL grant, the UE may shorten (e.g., contemporaneously with block 420 or later) the BWP inactivity timer and/or the SCell deactivation timer such that their expiration times are reached sooner. If the UL grant is the UL CG, the UE may shorten (e.g., contemporaneously with block 420 or later) the BWP inactivity timer and/or the SCell deactivation timer such that their expiration times are reached sooner. In aspect, the UE may stop the one or more timers, which would have the effect of immediately expiring the timers. In an aspect, how much to shorten the timers may be set within the UE. Alternatively or in addition thereto, the network (e.g., the base station 304 and/or the network entity 306, e.g., through their timer modules 388, 389) may configure the UE with the amount of shortening of the timers.

In a further aspect, block 430 may be implemented by the UE expediting the expiration of the one or more timers, e.g., by replacing (e.g., contemporaneously with block 420 or later) the one or more timers with one or more alternative timers associated with shorter respective expiration times. For example, if the UL grant is the dynamic UL grant and the UE determines to skip the transmission of user plane data on the dynamic UL grant, the UE may replace the DRX inactivity timer, the BWP inactivity timer, and/or the SCell deactivation timer with their alternative timers (e.g., replace drxInactivityTimer with drxInactivityTimerShort, bwpInactivityTimer with bwpInactivityTimerShort, scellDeactivationTimer with scellDeactivationTimerShort, etc.). If the UL grant is the dynamic UL grant and the UE determines to skip the transmission of user plane data on the dynamic UL grant, the UE may replace the BWP inactivity timer and/or the SCell deactivation timer with their alternative timers. If the UL grant is the UL CG, the UE may replace the BWP inactivity timer and/or the SCell deactivation timer with their alternative timers. In an aspect, the replacement timers and/or their shortened expiration times may be set within the UE. Alternatively or in addition thereto, the network (e.g., the base station 304 and/or the network entity 306, e.g., through their timer modules 388, 389) may configure the UE with the replacement timers and/or their shortened expiration times.

Figure 5:
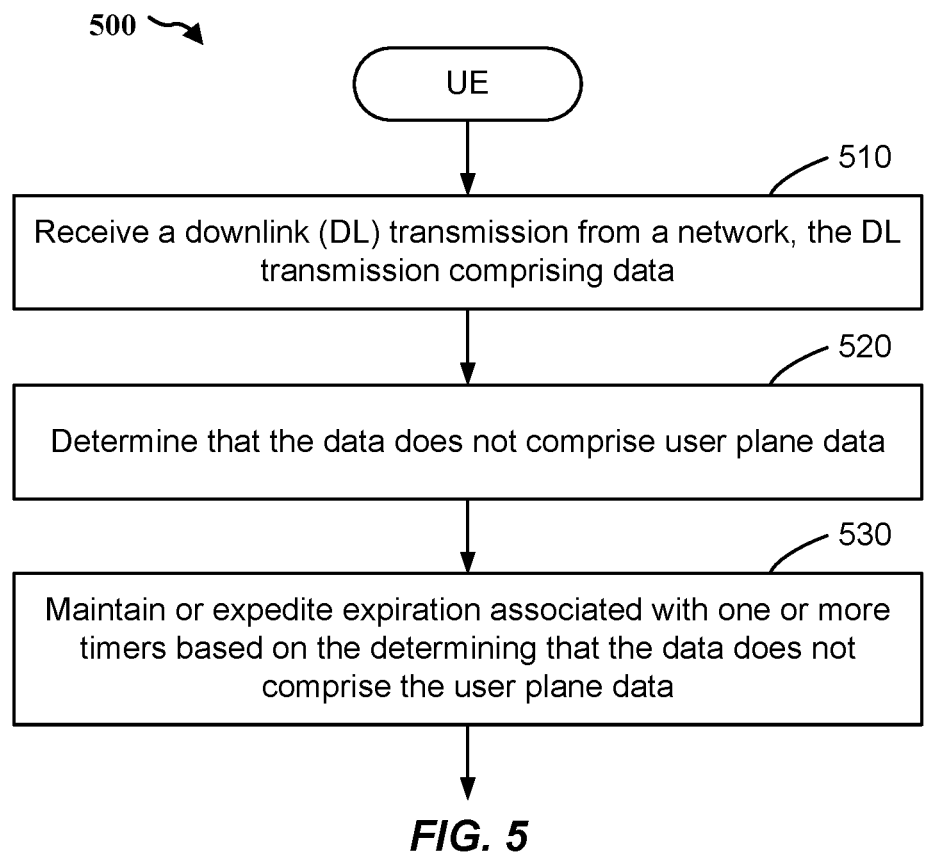
FIG. 5 illustrates a flow chart of another exemplary method of operating a user equipment, according to various aspects.

FIG. 5 illustrates a flow chart of another example method 500 of operating a UE, e.g., to enhance power efficiency in accordance with one or more aspects. In block 510, the UE (e.g., receiver 312, receiver 322, processing system 332, memory 340, timer module 342, etc.) may receive a DL transmission from a network (e.g., base station 304). The DL transmission may comprise data. A DL semi-persistent scheduling (SPS) may be an example of the DL transmission.

In block 520, the UE (e.g., processing system 332, memory 340, timer module 342, etc.) may determine that the received DL transmission does not comprise any user plane data. For example, the UE may check whether there are any MAC SDUs in the received DL SPS. If there are no MAC SDUs, the UE may determine that the received data does not comprise any user plane data.

In block 530, the UE (e.g., processing system 332, memory 340, timer module 342, etc.) may maintain or expedite expirations associated with one or more timers based on the determination made in block 520. That is, if it is determined that the received data does not include any user plane data in block 520, the expirations associated with the one or more timers may be maintained or expedited in block 530.

In an aspect, block 530 may be implemented by the UE maintaining the expiration of the one or more timers, e.g., by continuing to run the one or more timers in association with one or more respective unchanged expiration times. For example, the UE may continue to run the BWP inactivity timer and/or the SCell deactivation timer such that their expiration times are unchanged.

In another aspect, block 530 may be implemented by the UE expediting the expiration of the one or more timers, e.g., by shortening an amount of time until expiration of the one or more timers is reached. Again, expediting the one or more timers may take place anytime before the expiration of the one or more timers under previous expiration times.

For example, the UE may shorten (e.g., contemporaneously with block 520 or later) the BWP inactivity timer and/or the SCell deactivation timer such that their expiration times are reached sooner. A form of shortening can be to stop the one or more timers, which would have the effect of immediately expiring the timers. How much to shorten the timers may be set within the UE. Alternatively or in addition thereto, the network (e.g., the base station 304 and/or the network entity 306, e.g., through their timer modules 388, 389) may configure the UE with the amount of shortening of the timers.

In a further aspect, block 530 may be implemented by the UE expediting the expiration of the one or more timers, e.g., by replacing (e.g., contemporaneously with block 520 or later) the one or more timers with one or more alternative timers associated with shorter respective expiration times. For example, the UE may replace the BWP inactivity timer and/or the SCell deactivation timer with their alternative timers. The replacement timers and/or their shortened expiration times may be set within the UE. Alternatively or in addition thereto, the network (e.g., the base station 304 and/or the network entity 306, e.g., through their timer modules 388, 389) may configure the UE with the replacement timers and/or their shortened expiration times.

Figure 6:
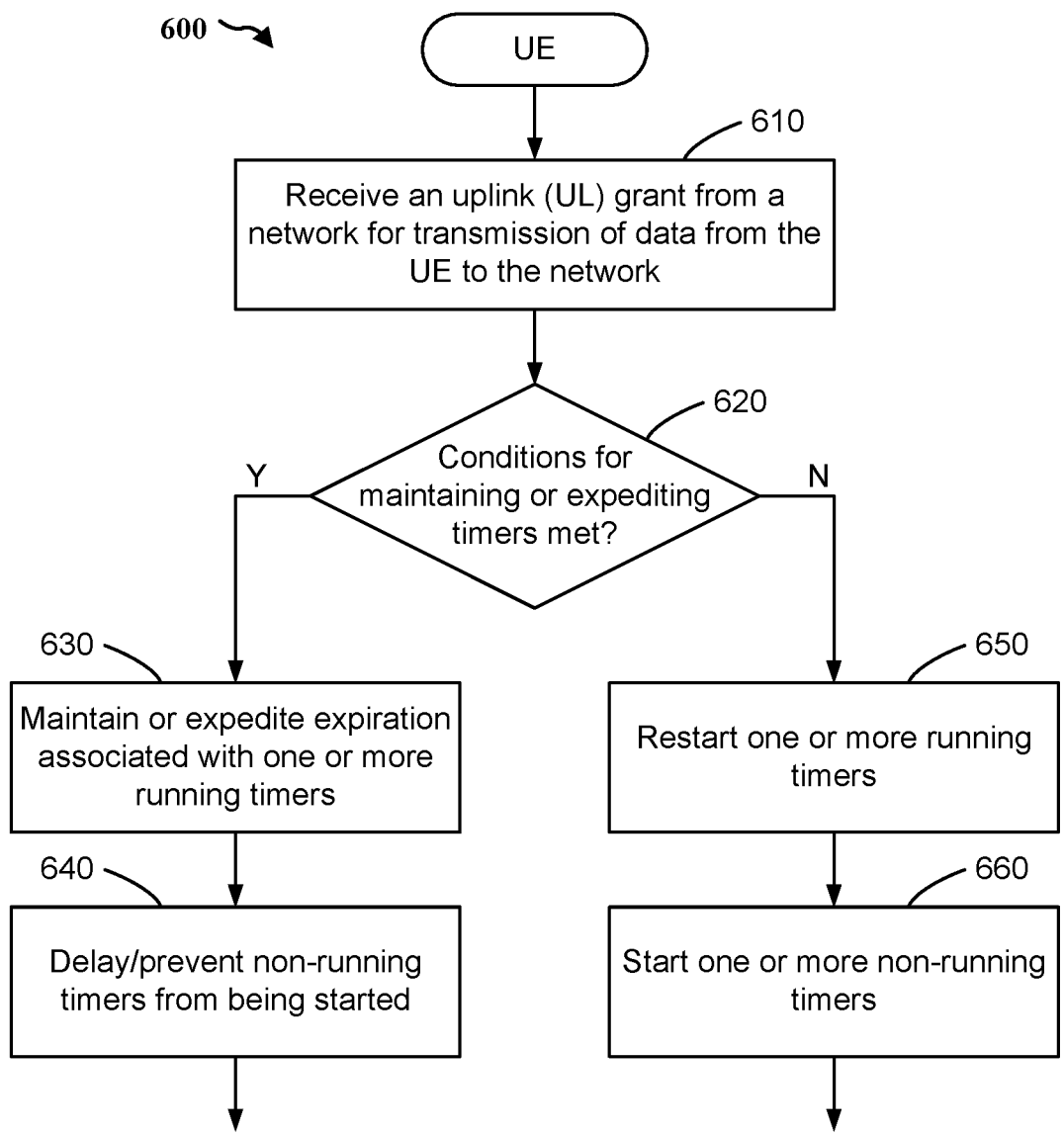
FIG. 6 illustrates a flow chart of another further exemplary method of operating a user equipment, according to various aspects.

FIG. 6 illustrates another flow chart of an example method 600 of operating a UE, e.g., to enhance power efficiency in accordance with one or more aspects. The UE may be any of the UEs described above (e.g., UE 104, UE 204, UE 302). From a perspective, method 600 may be viewed as a generalized version of method 400.

In block 610, the UE (e.g., receiver 312, receiver 322, processing system 332, memory 340, timer module 342, etc.) may receive a UL grant from the network. For example, a base station 304 (e.g., gNB) may send the UL grant to the UE. The UL grant may be for transmission of data from the UE to the network. That is, the UL grant may specify UL resources (e.g., control and/or shared channel resources) for use by the UE. The UL grant may be a dynamic UL grant or a UL configured grant (UL CG). As indicated, timers associated with the UL grant (e.g., dynamic UL grant, UL CG, etc.) may be maintained or expedited if the timers are running. If the timers are not running however, then the timers need not be started at all. Examples of such timers include the DRX inactivity timer, the BWP inactivity timer, the SCell deactivation timer, etc.

Note that at the time the UL grant is received, any of the UL grant associated timers may be running. Also, any of such timers may also be not running. For ease of reference and description, such timers running at the time of the UL grant may be referred to as "running" timers, and timers not running at the time the UL grant may be referred to as "non-running" timers.

In block 620, the UE (e.g., processing system 332, memory 340, timer module 342, etc.) may determine whether conditions for maintaining or expediting timers are met. The UE may make such determinations in a manner to similar to performing block 420 of FIG. 4. In an aspect, the UL grant may be a dynamic UL grant. In one example, the UE in block 620 may determine that the conditions are met if the UE has no data of any type to transmit on the dynamic UL grant. In this example, the UE may determine that the conditions are not met if there are data of any type to transmit.

Alternatively, the UE may make its determination based on more than whether or not there are data of any type to transmit. For example, the UE may determine that the conditions are met if both of the following are true: The UE has no data of any type to transmit; and N consecutive previous dynamic UL grants have been skipped—i.e., no data of any type were transmitted in N consecutive previous dynamic UL grants. Again, N may represent a number of consecutive dynamic UL grants in which the UE's behavior may be conventional. In this example, the UE may determine that the conditions are NOT met if one or both of the above are not true. That is, the UE may determine that the conditions for maintaining or expediting timers are not met if the UE has data of any type to transmit and/or if the number of consecutive previous dynamic UL grants that have been skipped is less than N.

In a further example, the UE may determine that the conditions are met if both of the following are true: The UE has no data of any type to transmit; and M consecutive previous UL slots all having dynamic UL grants have been skipped, i.e., no data of any type were transmitted in M consecutive previous slots all having dynamic UL grants. Again, M may represent a number of consecutive slots that had dynamic UL grants skipped in which the UE's behavior may be conventional. In this example, the UE may determine that the conditions are NOT met if one or both of the above are not true. That is, the UE may determine that the conditions are not met if the UE has data of any type to transmit and/or if the number of consecutive previous UL slots having dynamic UL grants that have been skipped is less than M.

If the UL grant is the dynamic UL grant, another way to implement block 620 may be to focus on transmission of user plane data. Recall that a MAC SDU containing data from dedicated traffic logic channels may be viewed as an example of user plane data. In this aspect, if there are no MAC SDUs containing data from dedicated traffic logic channels, then it may be determined that there are no user plane data. In one example, the UE may that the conditions are met if the UE has no user plane data to transmit on the dynamic UL grant. In this example, the UE may determine that the conditions are not met if there are user plane data to transmit.

In another example, the UE may determine that the conditions are met if both of the following are true: The UE has no user plane data to transmit; and no user plane data were transmitted in N consecutive previous dynamic UL grants. In this example, the UE may determine that the conditions are NOT met if one or both of the above are not true. That is, the UE may determine that the conditions are not met if the UE has user plane data to transmit and/or if the number of consecutive previous dynamic UL grants that have been skipped is less than N. Note that N discussed here in the context of dynamic UL grant and user plane data may be the same or different from N discussed above in the context of dynamic UL grant and data of any type.

In a further example, the UE may determine that the conditions are met if both of the following are true: The UE has no user plane data to transmit; and no user plane data were transmitted in M consecutive previous UL slots all having dynamic grants. In this example, the UE may determine that the conditions are NOT met if one or both of the above are not true. That is, the UE may determine that the conditions are not met if the UE has user plane data to transmit and/or if the number of consecutive previous UL slots having dynamic UL grants that have been skipped is less than M. Note that M discussed here in the context of dynamic UL grant and user plane data may be the same or different from M discussed above in the context of dynamic UL grant and data of any type.

If the UL grant is the UL CG grant, the UE may implement block 620 based on whether there is user plane data that can be transmitted on the UL CG. In one example, the UE may determine that the conditions are met if the UE has no user plane data to transmit on the UL CG. In this example, the UE may determine that the conditions are not met if there are user plane data to transmit.

In another example, the UE may determine that the conditions are met if both of the following are true: The UE has no user plane data to transmit on the UL CG; and no user plane data were transmitted in N consecutive previous UL CGs, i.e., have been skipped. In this example, the UE may determine that the conditions are NOT met if one or both of the above are not true. That is, the UE may determine that the conditions are not met if the UE has user plane data to transmit and/or if the number of consecutive previous UL CGs that have been skipped is less than N. Note that N discussed here in the context of UL CG and user plane data may be the same or different from N discussed in the context of dynamic UL grant and data of any type and/or same or different from N discussed in the context of dynamic UL grant and user plane data.

In a further example, the UE may determine that the conditions are met if both of the following are true: The UE has no user plane data to transmit on the UL CG; and no user plane data were transmitted in M consecutive previous UL slots all having UL CGs. In this example, the UE may determine that the conditions are NOT met if one or both of the above are not true. That is, the UE may determine that the conditions are not met if the UE has user plane data to transmit and/or if the number of consecutive previous UL slots having UL CGs that have been skipped is less than M. Note that M discussed here in the context of UL CG and user plane data may be the same or different from M discussed in the context of dynamic UL grant and data of any type and/or same or different from M discussed in the context of dynamic UL grant and user plane data.

If it is determined that the conditions are met ('Y' branch from block 620), then in block 630, the UE (e.g., processing system 332, memory 340, timer module 342, etc.) may maintain or expedite expirations associated with the one or more running timers. Examples of how the UE may maintain or expedite expirations associated with running timers are described above with respect to block 430, and thus will not be repeated here for brevity.

Alternatively or in addition thereto, in block 640, the UE may delay or otherwise prevent the non-running timers from being started. In one aspect, this may be passive in that the UE simply leaves alone the non-running timers. But in another aspect, this may be active in that the UE takes proactive steps to delay/prevent the non-running timers from starting. For example, there may be mechanism and/or protocol that starts one or more non-running timers automatically, e.g., upon UL grant being received. In such instances, the UE may override the automatic activation of such mechanism/protocol.

On the other hand, in block 620, if it is determined that the conditions for maintaining or expediting the timers are not met ('N' branch from block 620), then in block 650, the UE may restart any or all of the one or more running timers. Alternatively or in addition thereto, in block 660, the UE may start any or all of one more non-running timers.

Figure 7:
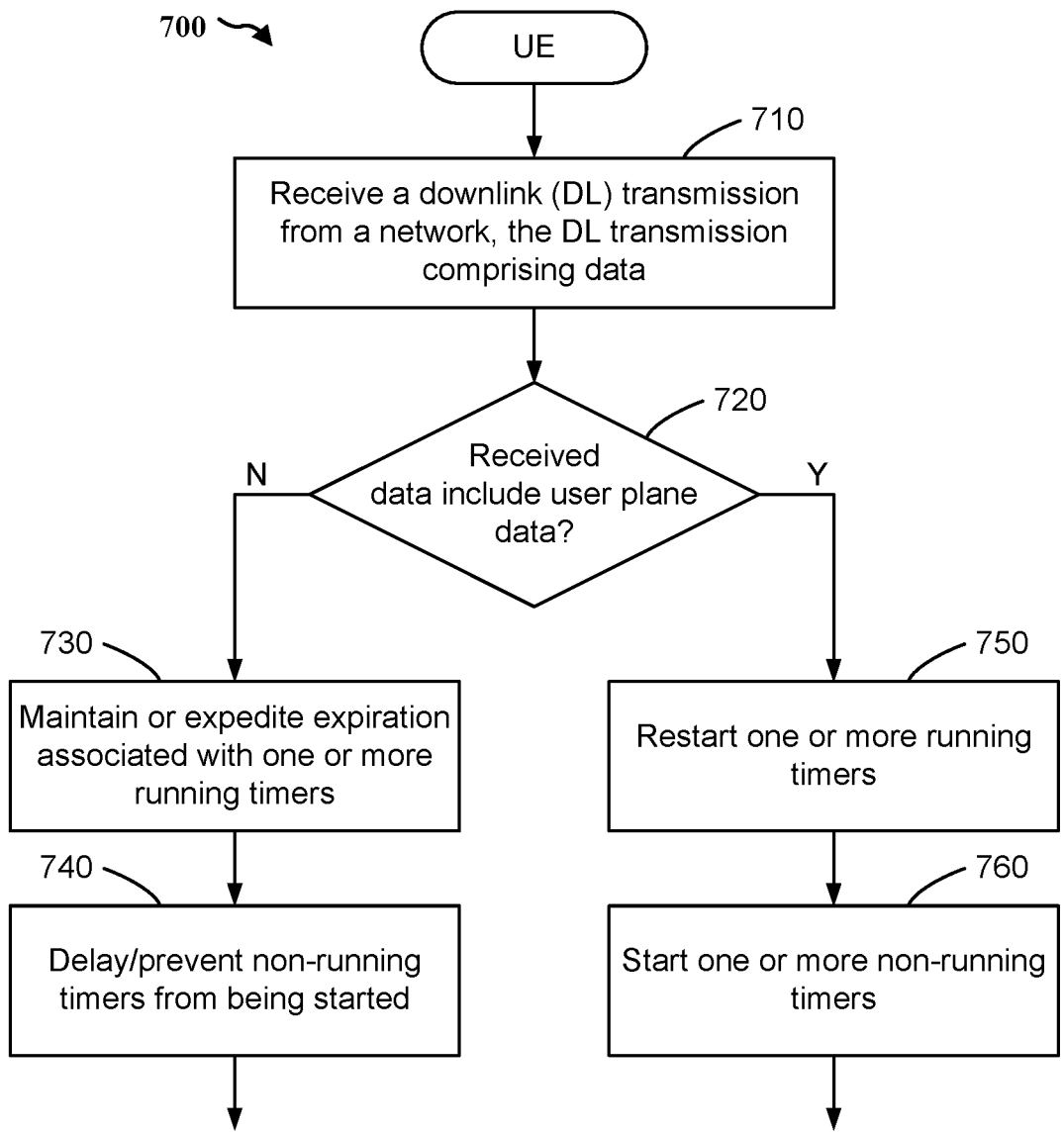
FIG. 7 illustrates a flow chart of another exemplary method of operating a user equipment, according to various aspects.

FIG. 7 illustrates a flow chart of another example method 700 of operating a UE, e.g., to enhance power efficiency in accordance with one or more aspects. From a perspective, method 700 may be viewed as a generalized version of method 500.

In block 710, the UE (e.g., receiver 312, receiver 322, processing system 332, memory 340, timer module 342, etc.) may receive a DL transmission from a network (e.g., base station 304). The DL transmission may comprise data. A DL semi-persistent scheduling (SPS) may be an example of the DL transmission.

In block 720, the UE (e.g., processing system 332, memory 340, timer module 342, etc.) may determine whether or not the received data include any user plane data. For example, the UE may check whether there are any MAC SDUs in the received DL SPS. If there are no MAC SDUs, the UE may determine that the received data does not include any user plane data. If there are MAC SDUs, then the UE may determine that the received data does include user plane data.

If it is determined that the received data has no user plane data ('N" branch from block 720), then in block 730, the UE (e.g., processing system 332, memory 340, timer module 342, etc.) may maintain or expedite expirations associated with one or more running timers based on the determination made in block 720. That is, if it is determined that the received DL transmission does not include any user plane data, the expirations associated with the one or more timers may be maintained or expedited in block 730. Examples of how the UE may maintain or expedite expirations associated with running timers are described above with respect to block 530, and thus will not be repeated here for brevity.

Alternatively or in addition thereto, in block 740, the UE may delay or otherwise prevent the non-running timers from being started. In one aspect, this may be passive in that the UE simply leaves alone the non-running timers. But in another aspect, this may be active in that the UE takes proactive steps to delay/prevent the non-running timers from starting. For example, there may be mechanism and/or protocol that starts one or more non-running timers automatically, e.g., upon DL grant being received. In such instances, the UE may override the automatic activation of such mechanism/protocol.

On the other hand, if it is determined that the received data does include user plane data ('Y' branch from block 720), then in block 750, the UE may restart the one or more running timers. Alternatively or in addition thereto, in block 760, the UE may start any one more non-running timers.

Figure 8:
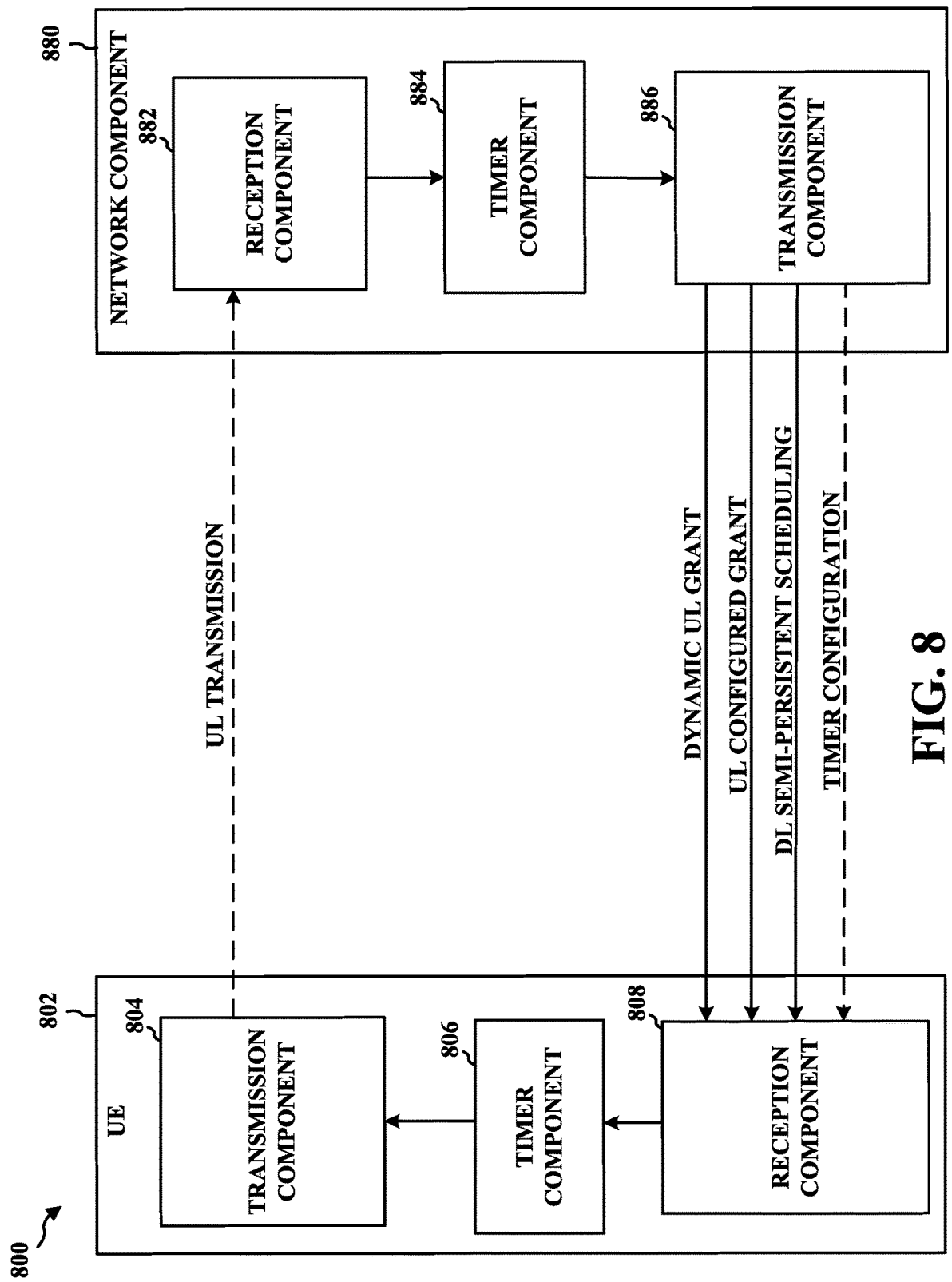
FIG. 8 is a conceptual data flow diagram illustrating the data flow between different means/components in exemplary apparatuses, according to various aspects.

FIG. 8 is a conceptual data flow diagram 800 illustrating examples of data flows between different means/components in exemplary apparatuses 802 and 880 in accordance with an embodiment of the disclosure. The apparatus 802 may be a UE (e.g., UE 104, UE 204, UE 302) in communication with an apparatus 880, which may be a network device (e.g., BS 102, gNB 222, eNB 224, BS 304, network entity 306).

The apparatus 802 may include a transmission component 804, which may correspond to transmitter circuitry in apparatus 302 as depicted in FIG. 3A, including transmitter 314, transmitter 324, antenna 316, antenna 326, processing system 332, memory 340, etc. The apparatus 802 may also include a timer component 806, which may correspond to processor circuitry in apparatus 302 as depicted in FIG. 3A, including processing system 332, memory 340, etc. The apparatus 802 may further include a reception component 808, which may correspond to reception circuitry in apparatus 302 as depicted in FIG. 3A, including receiver 312, receiver 322, antenna 316, antenna 326, processing system 332, memory 340, etc.

The apparatus 880 may include a reception component 882, which may correspond to receiver circuitry in apparatus 304 as depicted in FIG. 3B including receiver 352, receiver 362, antenna 356, antenna 366, network interface 380, processing system 382, memory 386, etc. Alternatively or in addition thereto, the reception component 882 may correspond to receiver circuitry in apparatus 306 as depicted in FIG. 3C including network interface 390, processing system 394, memory 396, etc. The apparatus 880 may also include a timer component 884, which may correspond to processor circuitry in apparatus 304 as depicted in FIG. 3B, including processing system 384, memory 386, etc. Alternatively or in addition thereto, the timer component 884 may correspond to processor circuitry in apparatus 306 as depicted in FIG. 3C, including processing system 394, memory 396, etc. The apparatus 880 may include a transmission component 886, which may correspond to transmitter circuitry in apparatus 304 as depicted in FIG. 3B including transmitter 354, transmitter 364, antenna 356, antenna 366, network interface 380, processing system 382, memory 386, etc. Alternatively or in addition thereto, the transmission component 886 may correspond to receiver circuitry in apparatus 306 as depicted in FIG. 3C including network interface 390, processing system 394, memory 396, etc.

Referring to FIG. 8, the UE 802 (e.g., the reception component 808) may receive UL grants (e.g., dynamic UL grant, UL CG) and/or DL transmissions (e.g., DL SPS) transmitted from the network component 880 (e.g., the transmission component 886). If the UL grant and/or the DL transmissions are received, the UE 802 (e.g., timer component 806) may determine to skip UL transmission of data of at least one data type. More generally, the UE 802 (e.g., timer component 806) may determine whether conditions for maintaining or expediting one or more running timers are met. For example, if the dynamic UL grant is received and the UE has no data of any type to send, the timer component 806 may determine that the conditions are met, and thus direct the transmission component 804 to skip the dynamic UL grant altogether. As another example, if the dynamic UL grant is received but the UE has no user plane data to send, the timer component 806 may determine that the conditions are met, and thus direct the transmission component 804 to skip the transmission of the user plane data on the dynamic UL grant. As a further example, if the UL CG is received but the UE has no user plane data to send on the configured UL CG, the timer component 806 may determine that the conditions are met, and thus direct the transmission component 804 to skip the transmission of the user plane data on the dynamic UL grant. Since the UL transmission can be skipped, the UL transmission from the UE 802 (e.g., the transmission component 804) to the network component 880 (e.g., the reception component 882) is dashed to show that the UL transmission can be optional.

If the UL grant and/or the DL transmissions are received, the UE 802 (e.g., timer component 806) may maintain or expedite expiration associated with one or more running timers. In an aspect, if the dynamic UL grant is received and it is determined that the dynamic UL grant is skipped altogether, the timer component 802 may maintain or expedite expiration associated with DRX inactivity timer, BWP inactivity timer, and/or SCell deactivation timer. In another aspect, if the dynamic UL grant is received and it is determined that transmission of user plane data will be skipped, the timer component 802 may maintain or expedite expiration associated with BWP inactivity timer and/or SCell deactivation timer. In a further aspect, if the UL CG is received and it is determined that transmission of user plane data will be skipped, the timer component 802 may maintain or expedite expiration associated with BWP inactivity timer and/or SCell deactivation timer. In yet another aspect, if the DL SPS includes no user plane data, the timer component 802 may maintain or expedite expiration associated with BWP inactivity timer and/or SCell deactivation timer.

The UE 802 (e.g., timer component 806) may maintain the one or more timers by continuing to run the one or more timers in association with one or more respective unchanged expiration times. Alternatively, the UE 802 (e.g., timer component 806) may expedite the expiration of the one or more timers by shortening an amount of time until expiration of the one or more timers is reached. In another alternative, UE 802 (e.g., timer component 806) may expedite the expiration of the one or more timers by replacing the one or more timers with one or more alternative timers associated with shorter respective expiration times.

In an aspect, the configuration of the timer component 806 may be set within the UE 802. Alternatively or in addition thereto, the network component 880 (e.g., timer component 884) may send a timer configuration message (e.g., through transmission component 886) to configure the timer component 806.

One or more components of the apparatus 802 may perform each of the blocks of the algorithm in the aforementioned flowcharts of FIGS. 4-7. As such, each block in the aforementioned flowcharts of FIGS. 4-7 may be performed by a component and the apparatus 802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
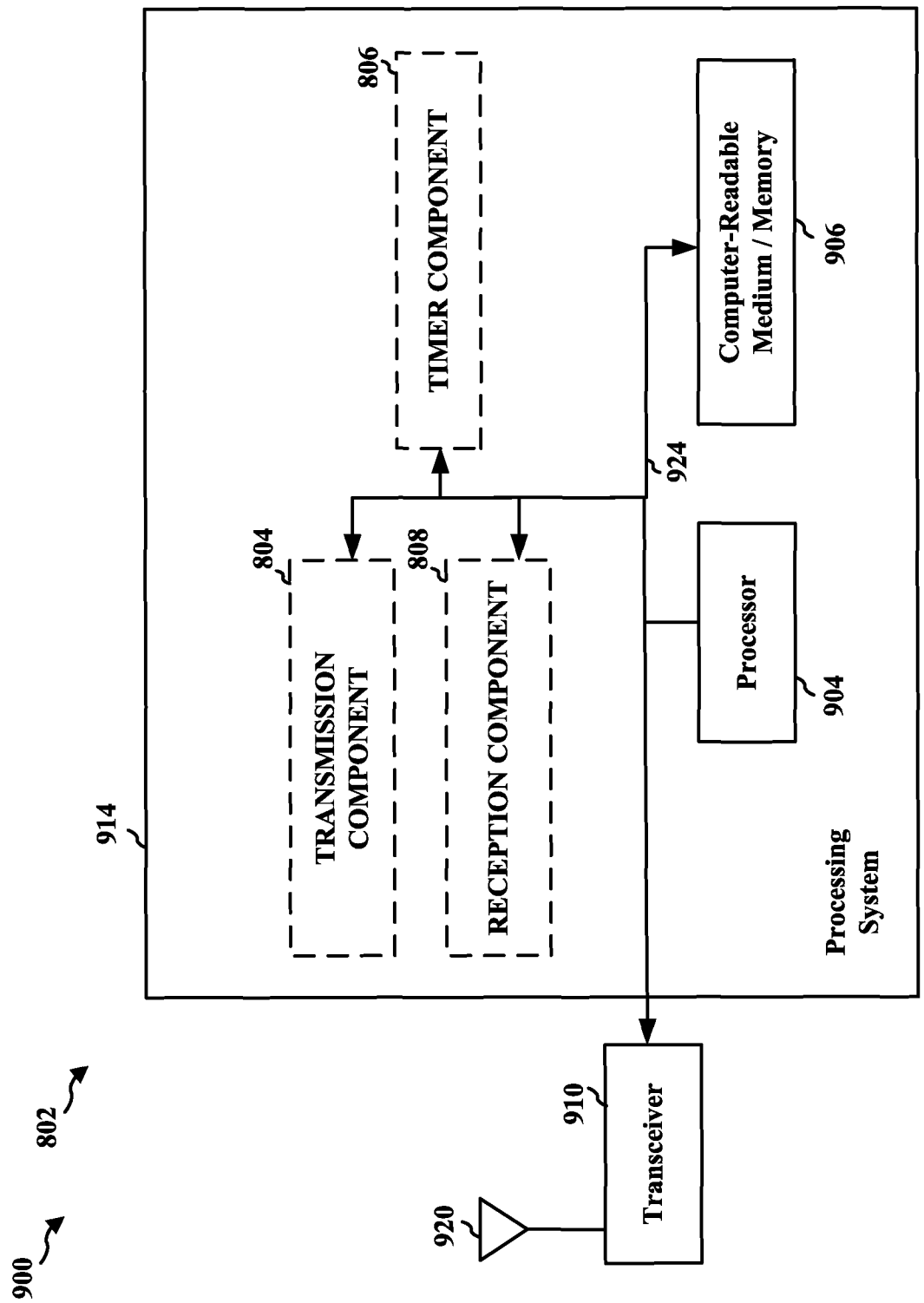
FIG. 9 is a diagram illustrating an example of a hardware implementation for an apparatus employing a processing system, according to various aspects.

FIG. 9 is a diagram 900 illustrating an example of a hardware implementation for an apparatus 802 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806 and 808, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910, which in turn may be coupled to one or more antennas 920. The transceiver 910 may provide means for communicating with various other apparatus over a transmission medium. The transceiver 910 may receive a signal from the one or more antennas 920, extract information from the received signal, and provide the extracted information to the processing system 914, specifically the reception component 808. In addition, the transceiver 910 may receive information from the processing system 914, specifically from the transmission component 804, and based on the received information, generate a signal to be applied to the one or more antennas 920. The processing system 914 may include a processor 904 coupled to a computer-readable medium/memory 906. The processor 904 may be responsible for general processing, including the execution of software stored on the computer-readable medium/memory 906. The software, when executed by the processor 904, may cause the processing system 914 to perform the various functions described supra for any particular apparatus. The computer-readable medium/memory 906 may also be used for storing data that is manipulated by the processor 904 when executing software. The processing system 914 may further include at least one of the components 804, 806 and 808. The components may be software components running in the processor 904, resident/stored in the computer readable medium/memory 906, one or more hardware components coupled to the processor 904, or some combination thereof. The processing system 914 may be a component of the UE 104, UE 204, or apparatus 302.

In one configuration, the apparatus 802 (e.g., a UE) may comprise means for receiving an uplink (UL) grant from a network for transmission of data from the UE to the network, means for determining whether conditions for maintaining or expediting timers are met, and means for maintaining or expediting expiration associated with one or more running timers if it is determined that the conditions for maintaining or expediting timers are met, each running timer being a timer associated with the UL grant and running at the time the UL grant is received.

In a further configuration, the apparatus 802 (e.g., a UE) may comprise means for receiving a downlink (DL) transmission from a network, the DL transmission comprising data, means for determining whether the received data include user plane data, and means for maintaining or expediting expiration associated with one or more running timers if it is determined that the received data does include the user plane data, each running timer being a timer associated with the DL transmission and running at the time the DL transmission is received.

The aforementioned means may be one or more of the aforementioned components of the apparatus 802 and/or the processing system 914 of the apparatus 802 configured to perform the functions recited by the aforementioned means. The processing system 914 may include transceiver 310 (including transmitter 314, receiver 312), transceiver 320 (including transmitter 324, receiver 322), antenna 316, antenna 326, processing system 332, memory 340, and timer module 342.

Figure 10:
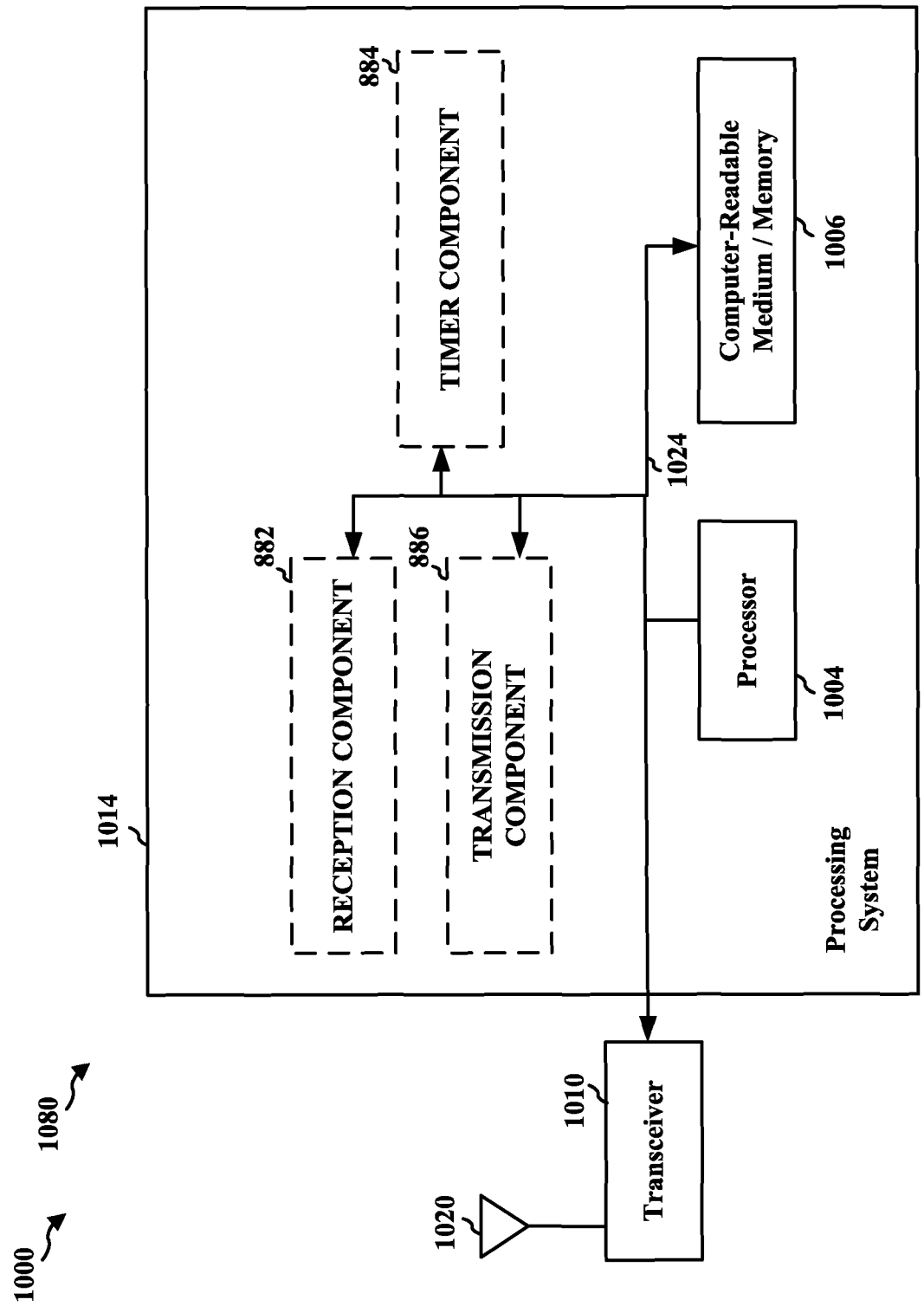
FIG. 10 is a diagram illustrating an example of another hardware implementation for an apparatus employing a processing system, according to various aspects.

FIG. 10 is a diagram 1000 illustrating an example of a hardware implementation for an apparatus 880 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 882, 884 and 886, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010, which in turn may be coupled to one or more antennas 1020. The transceiver 1010 may provide means for communicating with various other apparatus over a transmission medium. The transceiver 1010 may receive a signal from the one or more antennas 1020, extract information from the received signal, and provide the extracted information to the processing system 1014, specifically the reception component 882. In addition, the transceiver 1010 may receive information from the processing system 1014, specifically the transmission component 886, and based on the received information, generate a signal to be applied to the one or more antennas 1020. The processing system 1014 may include a processor 1004 coupled to a computer-readable medium/memory 1006. The processor 1004 may be responsible for general processing, including the execution of software stored on the computer-readable medium/memory 1006. The software, when executed by the processor 1004, may cause the processing system 1014 to perform the various functions described supra for any particular apparatus. The computer-readable medium/memory 1006 may also be used for storing data that is manipulated by the processor 1004 when executing software. The processing system 1014 may further include at least one of the components 882, 884 and 886. The components may be software components running in the processor 1004, resident/stored in the computer readable medium/memory 1006, one or more hardware components coupled to the processor 1004, or some combination thereof. The processing system 1014 may be a component of the BS 102, gNB 222, eNB 224, apparatus 304, or apparatus 306. The processing system 1014 may include transceiver 350 (including transmitter 354, receiver 352), transceiver 360 (including transmitter 364, receiver 362), antenna 356, antenna 366, network interface 380, processing system 384, memory 386, and timer module 388. Alternatively or in addition thereto, the processing system 1014 may include network interface 390, processing system 394, memory 396, and timer module 389.

In one configuration, the apparatus 880 (e.g., a BS or core network device) may include means for sending UL grants (e.g., dynamic UL grants, UL CGs, etc.) and/or DL SPSs to one or more UEs. The apparatus 880 may also include means for configuring timer component of the UEs.

Implementation examples are described in the following numbered clauses:

Clause 1: A method of a user equipment (UE), the method comprising: receiving an uplink (UL) grant from a network for transmission of data from the UE to the network; determining whether conditions for maintaining or expediting timers are met; and maintaining or expediting expiration associated with one or more running timers if it is determined that the conditions for maintaining or expediting timers are met, each running timer being a timer associated with the UL grant and running at the time the UL grant is received.

Clause 2: The method of Clause 1, further comprising: if it is determined that the conditions for maintaining or expediting timers are not met: restarting the one or more running timers, or starting one or more non-running timers, each non-running timer being a timer associated with the UL grant and not running at the time the UL grant is received, or both.

Clause 3: The method of any of Clauses 1-2, wherein the UL grant is a dynamic UL grant, and wherein in the determining, the UE determines that the conditions for maintaining or expediting timers are met if there are no data of any type to transmit on the dynamic UL grant.

Clause 4: The method of any of Clauses 1-2, wherein the UL grant is a dynamic UL grant, and wherein in the determining, the UE determines that the conditions for maintaining or expediting timers are met if there are no data of any type to transmit on the dynamic UL grant and no data of any type were transmitted in N consecutive previous dynamic UL grants.

Clause 5: The method of any of Clauses 1-2, wherein the UL grant is a dynamic UL grant, and wherein in the determining, the UE determines that the conditions for maintaining or expediting timers are met if there are no data of any type to transmit on the dynamic UL grant and no data of any type were transmitted in M consecutive previous UL slots all having dynamic UL grants.

Clause 6: The method of any of Clauses 1-2, wherein the UL grant is a dynamic UL grant, and wherein in the determining, the UE determines that the conditions for maintaining or expediting timers are met if there are no user plane data to transmit on the dynamic UL grant.

Clause 7: The method of any of Clauses 1-2, wherein the UL grant is a dynamic UL grant, and wherein in the determining, the UE determines that the conditions for maintaining or expediting timers are met if there are no user plane data to transmit on the dynamic UL grant and no user plane data were transmitted on N consecutive previous dynamic UL grants.

Clause 8: The method of any of Clauses 1-2, wherein the UL grant is a dynamic UL grant, and wherein in the determining, the UE determines that the conditions for maintaining or expediting timers are met if there are no user plane data to transmit and no user plane data were transmitted on M consecutive previous UL slots all having dynamic UL grants.

Clause 9: The method of any of Clauses 1-2, wherein the UL grant is a UL configured grant (CG), and wherein in the determining, the UE determines that the conditions for maintaining or expediting timers are met if there are no user plane data to transmit on the UL CG.

Clause 10: The method of any of Clauses 1-2, wherein the UL grant is a UL configured grant (CG), and wherein in the determining, the UE determines that the conditions for maintaining or expediting timers are met if there are no user plane data to transmit on the UL CG and no user plane data were transmitted on N consecutive previous UL CGs.

Clause 11: The method of any of Clauses 1-2, wherein the UL grant is a UL configured grant (CG), and wherein in the determining, the UE determines that the conditions for maintaining or expediting timers are met if there are no user plane data to transmit on the UL CG, and no user plane data were transmitted on M consecutive previous UL slots all having UL CGs.

Clause 12: The method of any of Clauses 1-11, wherein in the maintaining or expediting, the UE maintains the expiration of the one or more running timers by continuing to run the one or more running timers in association with one or more respective unchanged expiration times.

Clause 13: The method of Clause 12, wherein the UE maintains the expiration of any one or more of a discontinuous reception (DRX) inactivity timer, a bandwidth part (BWP) inactivity timer, and a secondary cell (SCell) deactivation timer if the UL grant is a dynamic UL grant and the UE determines that there are no data of any type to transmit on the dynamic UL grant, or wherein the UE maintains the expiration of any one or more of the BWP inactivity timer and the SCell deactivation timer if the UL grant is the dynamic UL grant and the UE determines that there are no user plane data to transmit on the dynamic UL grant, or wherein the UE maintains the expiration of any one or more of the BWP inactivity timer and the SCell deactivation timer if the UL grant is a UL configured grant (CG) and the UE determines that there are no user plane data to transmit on the UL CG.

Clause 14: The method of any of Clauses 1-11, wherein in the maintaining or expediting, the UE expedites the expiration of the one or more running timers by shortening the expiration of the one or more running timers.

Clause 15: The method of Clause 14, wherein the UE shortens the amount of time until expiration of any one or more of a discontinuous reception (DRX) inactivity timer, a bandwidth part (BWP) inactivity timer, and a secondary cell (SCell) deactivation timer if the UL grant is a dynamic UL grant and the UE determines that there are no data of any type to transmit on the dynamic UL grant, or wherein the UE shortens the amount of time until expiration of any one or more of the BWP inactivity timer and the SCell deactivation timer if the UL grant is the dynamic UL grant and the UE determines that there are no user plane data to transmit on the dynamic UL grant, or wherein the UE shortens the amount of time until expiration of any one or more of the BWP inactivity timer and the SCell deactivation timer if the UL grant is a UL configured grant (CG) and the UE determines that there are no user plane data to transmit on the UL CG.

Clause 16: The method of any of Clauses 1-11, wherein in the maintaining or expediting, the UE expedites the expiration of the one or more running timers by replacing the one or more running timers with one or more alternative timers associated with one or more shorter respective expiration times.

Clause 17: The method of Clause 16, wherein the UE replaces any one or more of a discontinuous reception (DRX) inactivity timer, a bandwidth part (BWP) inactivity timer, and a secondary cell (SCell) deactivation timer with their corresponding alternative timers if the UL grant is a dynamic UL grant the UE determines that there are no data of any type to transmit on the dynamic UL grant, or wherein the UE replaces any one or more of the BWP inactivity timer and the SCell deactivation timer with their corresponding alternative timers if the UL grant is the dynamic UL grant and the UE determines that there are no user plane data to transmit on the dynamic UL grant, or wherein the UE replaces any one or more of the BWP inactivity timer and the SCell deactivation timer with their corresponding alternative timers if the UL grant is a UL configured grant (CG) and the UE determines that there are no user plane data to transmit on the UL CG.

Clause 18: A user equipment comprising at least one means for performing a method of any of Clauses 1-17.

Clause 19: A user equipment comprising a processor, memory coupled with the processor, the processor and memory configured perform a method of any of Clauses 1-17.

Clause 20: A non-transitory computer-readable medium storing code for a user equipment comprising a processor, memory coupled with the processor, and instructions stored in the memory and executable by the processor to cause the user equipment to perform a method of any of Clauses 1-17.

Clause 21: A method of a user equipment (UE), the method comprising: receiving a downlink (DL) transmission from a network, the DL transmission comprising data; determining whether the received data include user plane data; and maintaining or expediting expiration associated with one or more running timers if it is determined that the received data does include the user plane data, each running timer being a timer associated with the UL grant and running at the time the DL transmission is received.

Clause 22: The method of Clause 21, further comprising: if it is determined that the received data does include the user plane data: restarting the one or more running timers, or starting one or more non-running timers, each non-running timer being a timer associated with the UL grant and not running at the time the UL grant is received, or both.

Clause 23: The method of any of Clauses 21-22, wherein the DL transmission is DL semi-persistent scheduling (SPS).

Clause 24: The method of Clause 23, wherein in the determining, the UE determines that the data does not include user plane data if the DL SPS does not include the user plane data.

Clause 25: The method of any of Clauses 21-24, wherein in the maintaining or expediting, the UE maintains the expiration of the one or more running timers by continuing to run the one or more running timers in association with one or more respective unchanged expiration times.

Clause 26: The method of Clause 25, wherein the UE maintains the expiration of any one or more of a bandwidth part (BWP) inactivity timer and a secondary cell (SCell) deactivation timer.

Clause 27: The method of any of Clauses 21-26, wherein in the maintaining or expediting, the UE expedites the expiration of the one or more running timers by shortening the expiration of the one or more running timers.

Clause 28: The method of Clause 27, wherein the UE shortens the expiration of any one or more of a bandwidth part (BWP) inactivity timer and a secondary cell (SCell) deactivation timer.

Clause 29: The method of any of Clauses 21-28, wherein in the maintaining or expediting, the UE expedites the expiration of the one or more running timers by replacing the one or more running timers with one or more alternative timers associated with one or more shorter respective expiration times.

Clause 30: The method of Clause 29, wherein the UE replaces any one or more of a bandwidth part (BWP) inactivity timer and a secondary cell (SCell) deactivation timer with their corresponding alternative timers.

Clause 31: A user equipment comprising at least one means for performing a method of any of Clauses 21-30.

Clause 32: A user equipment comprising a processor, memory coupled with the processor, the processor and memory configured perform a method of any of Clauses 21-30.

Clause 33: A non-transitory computer-readable medium storing code for a user equipment comprising a processor, memory coupled with the processor, and instructions stored in the memory and executable by the processor to cause the user equipment to perform a method of any of Clauses 21-30.

Clause 34: A method of a user equipment (UE), the method comprising: receiving an uplink (UL) grant for transmission of data from the UE to a network; determining to skip transmission of data of at least one data type on the UL grant; and maintaining or expediting expiration associated with one or more timers based on the determining to skip the transmission.

Clause 35: The method of Clause 34, wherein the UL grant is a dynamic UL grant.

Clause 36: The method any of Clauses 34-35, wherein in the determining, the UE determines to skip the dynamic UL grant if there is no data of any type to transmit.

Clause 37: The method of any of Clauses 34-35, wherein in the determining, the UE determines to skip the dynamic UL grant if there is no data of any type to transmit and if N consecutive previous dynamic UL grants have been skipped.

Clause 38: The method of any of Clauses 34-35, wherein in the determining, the UE determines to skip the dynamic UL grant if there is no data of any type to transmit and if M consecutive previous UL slots all having dynamic UL grants were skipped.

Clause 39: The method of any of Clauses 34-35, wherein in the determining, the UE determines to skip transmission of the user plane data on the dynamic UL grant if there are no user plane data to transmit.

Clause 40: The method of Clauses 34-35, wherein in the determining, the UE determines to skip transmission of the user plane data on the dynamic UL grant if there are no user plane data to transmit and if no user plane data were transmitted on N consecutive previous dynamic UL grants.

Clause 41: The method of Clauses 34-35, wherein in the determining, the UE determines to skip transmission of the user plane data on the dynamic UL grant if there are no user plane data to transmit and if M consecutive previous UL slots all having dynamic UL grants on which no user plane data were transmitted.

Clause 42: The method of Clause 34, wherein the UL grant is a UL configured grant (CG).

Clause 43: The method of any of Clauses 41-42, wherein in the determining, the UE determines to skip transmission of the user plane data on the UL CG if there are no user plane data to transmit.

Clause 44: The method of any of Clauses 41-42, wherein in the determining, the UE determines to skip transmission of the user plane data on the UL CG if there are no user plane data to transmit and if no user plane data were transmitted on N consecutive previous UL CGs.

Clause 45: The method of any of Clauses 41-42, wherein in the determining, the UE determines to skip transmission of the user plane data on the UL CG if there are no user plane data to transmit, and if M consecutive previous UL slots all having UL CGs on which no user plane data were transmitted.

Clause 46: The method of any of Clauses 34-45, wherein in the maintaining or expediting, the UE maintains the expiration of the one or more timers by continuing to run the one or more timers in association with one or more respective unchanged expiration times.

Clause 47: The method of Clause 46, wherein the UE maintains the expiration of any one or more of a discontinuous reception (DRX) inactivity timer, a bandwidth part (BWP) inactivity timer, and a secondary cell (SCell) deactivation timer if the UL grant is a dynamic UL grant and the UE determines to skip the dynamic UL grant, or wherein the UE maintains the expiration of any one or more of the BWP inactivity timer and the SCell deactivation timer if the UL grant is the dynamic UL grant and the UE determines to skip transmission of user plane data on the dynamic UL grant, or wherein the UE maintains the expiration of any one or more of the BWP inactivity timer and the SCell deactivation timer if the UL grant is a UL configured grant (CG).

Clause 48: The method of any of Clauses 34-45, wherein in the maintaining or expediting, the UE expedites the expiration of the one or more timers by shortening an amount of time until expiration of the one or more timers is reached.

Clause 49: The method of Clause 48, wherein the UE shortens the amount of time until expiration of any one or more of a discontinuous reception (DRX) inactivity timer, a bandwidth part (BWP) inactivity timer, and a secondary cell (SCell) deactivation timer if the UL grant is a dynamic UL grant and the UE determines to skip the dynamic UL grant, or wherein the UE shortens the amount of time until expiration of any one or more of the BWP inactivity timer and the SCell deactivation timer if the UL grant is the dynamic UL grant and the UE determines to skip transmission of user plane data on the dynamic UL grant, or wherein the UE shortens the amount of time until expiration of any one or more of the BWP inactivity timer and the SCell deactivation timer if the UL grant is a UL configured grant (CG).

Clause 50: The method of any of Clauses 34-45, wherein in the maintaining or expediting, the UE expedites the expiration of the one or more timers by replacing the one or more timers with one or more alternative timers associated with one or more shorter respective expiration times.

Clause 51: The method of Clause 50, wherein the UE replaces any one or more of a discontinuous reception (DRX) inactivity timer, a bandwidth part (BWP) inactivity timer, and a secondary cell (SCell) deactivation timer with their corresponding alternative timers if the UL grant is a dynamic UL grant and the UE determines to skip the dynamic UL grant, or wherein the UE replaces any one or more of the BWP inactivity timer and the SCell deactivation timer with their corresponding alternative timers if the UL grant is the dynamic UL grant and the UE determines to skip transmission of user plane data on the dynamic UL grant, or wherein the UE replaces any one or more of the BWP inactivity timer and the SCell deactivation timer with their corresponding alternative timers if the UL grant is a UL configured grant (CG).

Clause 52: A user equipment comprising at least one means for performing a method of any of Clauses 34-51.

Clause 53: A user equipment comprising a processor, memory coupled with the processor, the processor and memory configured perform a method of any of Clauses 34-51.

Clause 54: A non-transitory computer-readable medium storing code for a user equipment comprising a processor, memory coupled with the processor, and instructions stored in the memory and executable by the processor to cause the user equipment to perform a method of any of Clauses 34-51.

Clause 55: A method of a user equipment (UE), the method comprising: receiving a downlink (DL) transmission from a network, the DL transmission comprising data; determining that the data does not comprise user plane data; and maintaining or expediting expiration associated with one or more timers based on the determining that the data does not comprise the user plane data.

Clause 56: The method of Clause 55, wherein the DL transmission is DL semi-persistent scheduling (SPS).

Clause 57: The method of any of Clauses 55-56, wherein in the determining, the UE determines that the data does not comprise user plane data if the DL SPS does not include the user plane data.

Clause 58: The method of any of Clauses 55-57, wherein in the maintaining or expediting, the UE maintains the expiration of the one or more timers by continuing to run the one or more timers in association with one or more respective unchanged expiration times.

Clause 59: The method of Clause 58, wherein the UE maintains the expiration of any one or more of the BWP inactivity timer and the SCell deactivation timer.

Clause 60: The method of any of Clauses 55-57, wherein in the maintaining or expediting, the UE expedites the expiration of the one or more timers by shortening an amount of time until expiration of the one or more timers is reached.

Clause 61: The method of Clause 60, wherein the UE shortens the amount of time until expiration of any one or more of the BWP inactivity timer and the SCell deactivation timer.

Clause 62: The method of any of Clauses 55-57, wherein in the maintaining or expediting, the UE expedites the expiration of the one or more timers by replacing the one or more timers with one or more alternative timers associated with one or more shorter respective expiration times.

Clause 63: The method of Clause 62, wherein the UE replaces any one or more of the BWP inactivity timer and the SCell deactivation timer with their corresponding alternative timers.

Clause 64: A user equipment comprising at least one means for performing a method of any of Clauses 55-63.

Clause 65: A user equipment comprising a processor, memory coupled with the processor, the processor and memory configured perform a method of any of Clauses 55-63.

Clause 73: A non-transitory computer-readable medium storing code for a user equipment comprising a processor, memory coupled with the processor, and instructions stored in the memory and executable by the processor to cause the user equipment to perform a method of any of Clauses 55-63.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of a user equipment (UE), the method comprising:
   receiving an uplink (UL) grant from a network for transmission of data from the UE to the network;
   determining whether conditions for maintaining or expediting timers are met in a case that there are no data to transmit on the UL grant or there are no user plane data to transmit on the UL grant;
   maintaining or expediting expiration associated with one or more running timers if it is determined that the conditions for maintaining or expediting timers are met, each running timer being a timer associated with rendering a respective function deactivated or inactive and being running at the time the UL grant is received; and
   if it is determined that the conditions for maintaining or expediting timers are not met:
      restarting the one or more running timers, or
      starting one or more non-running timers, each non-running timer being a timer rendering another respective function deactivated or inactive and being not running at the time the UL grant is received, or both,
   wherein determining whether the conditions for maintaining or expediting timers are met comprises determining that the conditions are met based on:
      determining there are no data to transmit on the UL grant and no data were transmitted in N consecutive previous UL grants of the same type as the UL grant,
      determining there are no data to transmit on the UL grant and no data were transmitted in M consecutive previous UL slots having previous UL grants of the same type as the UL grant,
      determining there are no user plane data to transmit on the UL grant and no user plane data were transmitted in the N consecutive previous UL grants of the same type as the UL grant, or
      determining there are no user plane data to transmit on the UL grant and no user plane data were transmitted in the M consecutive previous UL slots having the previous UL grants of the same type as the UL grant, and
   wherein M and N are positive integers greater than one.

2. The method of claim 1,
   wherein the UL grant is a dynamic UL grant.

3. The method of claim 1,
   wherein the UL grant is a UL configured grant (CG).

4. The method of claim 1, wherein in the maintaining or expediting, the UE maintains the expiration of the one or more running timers by continuing to run the one or more running timers in association with one or more respective unchanged expiration times.

5. The method of claim 4,
   wherein the UE maintains the expiration of any one or more of a discontinuous reception (DRX) inactivity timer, a bandwidth part (BWP) inactivity timer, and a secondary cell (SCell) deactivation timer if the UL grant is a dynamic UL grant and the UE determines that there are no data of any type to transmit on the dynamic UL grant, or
   wherein the UE maintains the expiration of any one or more of the BWP inactivity timer and the SCell deactivation timer if the UL grant is the dynamic UL grant and the UE determines that there are no user plane data to transmit on the dynamic UL grant, or
   wherein the UE maintains the expiration of any one or more of the BWP inactivity timer and the SCell deactivation timer if the UL grant is a UL configured grant (CG) and the UE determines that there are no user plane data to transmit on the UL CG.

6. The method of claim 1, wherein in the maintaining or expediting, the UE expedites the expiration of the one or more running timers by shortening a corresponding amount of time until the expiration of the one or more running timers.

7. The method of claim 6,
   wherein the UE shortens the amount of time until expiration of any one or more of a discontinuous reception (DRX) inactivity timer, a bandwidth part (BWP) inactivity timer, and a secondary cell (SCell) deactivation timer if the UL grant is a dynamic UL grant and the UE determines that there are no data of any type to transmit on the dynamic UL grant, or
   wherein the UE shortens the amount of time until expiration of any one or more of the BWP inactivity timer and the SCell deactivation timer if the UL grant is the dynamic UL grant and the UE determines that there are no user plane data to transmit on the dynamic UL grant, or
   wherein the UE shortens the amount of time until expiration of any one or more of the BWP inactivity timer and the SCell deactivation timer if the UL grant is a UL configured grant (CG) and the UE determines that there are no user plane data to transmit on the UL CG.

8. The method of claim 1, wherein in the maintaining or expediting, the UE expedites the expiration of the one or more running timers by replacing the one or more running timers with one or more alternative timers associated with one or more shorter respective expiration times.

9. The method of claim 8,
   wherein the UE replaces any one or more of a discontinuous reception (DRX) inactivity timer, a bandwidth part (BWP) inactivity timer, and a secondary cell (SCell) deactivation timer with their corresponding alternative timers if the UL grant is a dynamic UL grant the UE determines that there are no data of any type to transmit on the dynamic UL grant, or
   wherein the UE replaces any one or more of the BWP inactivity timer and the SCell deactivation timer with their corresponding alternative timers if the UL grant is the dynamic UL grant and the UE determines that there are no user plane data to transmit on the dynamic UL grant, or
   wherein the UE replaces any one or more of the BWP inactivity timer and the SCell deactivation timer with their corresponding alternative timers if the UL grant is a UL configured grant (CG) and the UE determines that there are no user plane data to transmit on the UL CG.

10. A user equipment (UE), comprising:
    a memory;
    at least one transceiver; and
    at least one processor communicatively coupled to the memory and the at least one transceiver, the at least one processor configured to:
       receive an uplink (UL) grant from a network for transmission of data from the UE to the network;

determine whether conditions for maintaining or expediting timers are met in a case that there are no data to transmit on the UL grant or there are no user plane data to transmit on the UL grant;

maintain or expedite expiration associated with one or more running timers if it is determined that the conditions for maintaining or expediting timers are met, each running timer being a timer associated with rendering a respective function deactivated or inactive and being running at the time the UL grant is received; and if it is determined that the conditions for maintaining or expediting timers are not met:
restart the one or more running timers, or
start one or more non-running timers, each non-running timer being a timer rendering another respective function deactivated or inactive and being not running at the time the UL grant is received, or
both, wherein the at least one processor is configured to determine that the conditions for maintaining or expediting timers are met based on:
determining there are no data to transmit on the UL grant and no data were transmitted in N consecutive previous UL grants of the same type as the UL grant,
determining there are no data to transmit on the UL grant and no data were transmitted in M consecutive previous UL slots having previous UL grants of the same type as the UL grant,
determining there are no user plane data to transmit on the UL grant and no user plane data were transmitted in the N consecutive previous UL grants of the same type as the UL grant, or
determining there are no user plane data to transmit on the UL grant and no user plane data were transmitted in the M consecutive previous UL slots having the previous UL grants of the same type as the UL grant, and
wherein M and N are positive integers greater than one.

11. The UE of claim 10,
wherein the UL grant is a dynamic UL grant.

12. The UE of claim 10,
wherein the UL grant is a UL configured grant (CG).

13. The UE of claim 10, wherein the at least one processor is configured to maintain the expiration of the one or more running timers by continuing to run the one or more running timers in association with one or more respective unchanged expiration times.

14. The UE of claim 10, wherein the at least one processor is configured to expedite the expiration of the one or more running timers by shortening a corresponding amount of time until the expiration of the one or more running timers.

15. The UE claim 10, wherein the at least one processor is configured to expedite the expiration of the one or more running timers by replacing the one or more running timers with one or more alternative timers associated with one or more shorter respective expiration times.

16. A user equipment (UE), comprising:
means for receiving an uplink (UL) grant from a network for transmission of data from the UE to the network;
means for determining whether conditions for maintaining or expediting timers are met in a case that there are no data to transmit on the UL grant or there are no user plane data to transmit on the UL grant; and
means for maintaining or expediting expiration associated with one or more running timers if it is determined that the conditions for maintaining or expediting timers are met, each running timer being a timer associated with rendering a respective function deactivated or inactive and being running at the time the UL grant is received,
wherein the UE further comprise:
means for restarting the one or more running timers if it is determined that the conditions for maintaining or expediting timers are not met, or
means for starting one or more non-running timers if it is determined that the conditions for maintaining or expediting timers are not met, each non-running timer being a timer associated with rendering another respective function deactivated or inactive and being not running at the time the UL grant is received, or
both,
wherein the means for determining whether the conditions for maintaining or expediting timers are met comprises means for determining that the conditions are met based on:
determining there are no data to transmit on the UL grant and no data were transmitted in N consecutive previous UL grants of the same type as the UL grant,
determining there are no data to transmit on the UL grant and no data were transmitted in M consecutive previous UL slots having previous UL grants of the same type as the UL grant,
determining there are no user plane data to transmit on the UL grant and no user plane data were transmitted in the N consecutive previous UL grants of the same type as the UL grant, or
determining there are no user plane data to transmit on the UL grant and no user plane data were transmitted in the M consecutive previous UL slots having the previous UL grants of the same type as the UL grant, and
wherein M and N are positive integers greater than one.

17. The UE of claim 16, wherein
the UL grant is a dynamic UL grant, or
the UL grant is a UL configured grant (CG).

18. The UE of claim 16, wherein the means for maintaining or expediting the expiration associated with the one or more running timers comprises means for continuing to run the one or more running timers in association with one or more respective unchanged expiration times.

19. The UE of claim 16, wherein the means for maintaining or expediting the expiration associated with the one or more running timers comprises means for shortening a corresponding amount of time until the expiration of the one or more running timers.

20. The UE of claim 16, wherein the means for maintaining or expediting the expiration associated with the one or more running timers comprises means for replacing the one or more running timers with one or more alternative timers associated with one or more shorter respective expiration times.

21. A non-transitory computer-readable medium containing instructions for a user equipment (UE) stored thereon, the instructions causing the UE to:
receive an uplink (UL) grant from a network for transmission of data from the UE to the network;
determine whether conditions for maintaining or expediting timers are met in a case that there are no data to transmit on the UL grant or there are no user plane data to transmit on the UL grant; and
maintain or expedite expiration associated with one or more running timers if it is determined that the conditions for maintaining or expediting timers are met, each running timer being a timer associated with rendering a respective function deactivated or inactive and being running at the time the UL grant is received, wherein the instructions further cause the UE to:
- restart the one or more running timers if it is determined that the conditions for maintaining or expediting timers are not met, or
- start one or more non-running timers if it is determined that the conditions for maintaining or expediting timers are not met, each non-running timer being a timer associated with rendering another respective function deactivated or inactive and being not running at the time the UL grant is received, or
- both, wherein the instructions causing the UE to determine whether the conditions for maintaining or expediting timers are met comprises instructions causing the UE to determine that the conditions are met based on:
- determining there are no data to transmit on the UL grant and no data were transmitted in N consecutive previous UL grants of the same type as the UL grant,
- determining there are no data to transmit on the UL grant and no data were transmitted in M consecutive previous UL slots having previous UL grants of the same type as the UL grant,
- determining there are no user plane data to transmit on the UL grant and no user plane data were transmitted in the N consecutive previous UL grants of the same type as the UL grant, or
- determining there are no user plane data to transmit on the UL grant and no user plane data were transmitted in the M consecutive previous UL slots having the previous UL grants of the same type as the UL grant, and wherein M and N are positive integers greater than one.

22. The non-transitory computer-readable medium of claim 21, wherein
- the UL grant is a dynamic UL grant, or
- the UL grant is a UL configured grant (CG).

23. The non-transitory computer-readable medium of claim 21, wherein the instructions cause the UE to maintain or expedite the expiration associated with the one or more running timers further cause the UE to continue to run the one or more running timers in association with one or more respective unchanged expiration times.

24. The non-transitory computer-readable medium of claim 21, wherein the instructions cause the UE to maintain or expedite the expiration associated with the one or more running timers further cause the UE to shorten a corresponding amount of time until the expiration of the one or more running timers.

25. The non-transitory computer-readable medium of claim 21, wherein the instructions cause the UE to maintain or expedite the expiration associated with the one or more running timers further cause the UE to replace the one or more running timers with one or more alternative timers associated with one or more shorter respective expiration times.

* * * * *